United States Patent [19]

Tanaka et al.

[11] Patent Number: 5,433,672
[45] Date of Patent: Jul. 18, 1995

[54] INSCRIBED MESHING PLANETARY GEAR CONSTRUCTION

[75] Inventors: Hideyoshi Tanaka; Atsushi Takahashi; Toshiyuki Konishi; Atsushi Ishigaki, all of Ohbu; Kiyoji Minegishi, Aichi; Masayuki Tanigawa, Kariya; Masanori Egawa, Chiryu, all of Japan

[73] Assignee: Sumitomo Heavy Industries, Ltd., Tokyo, Japan

[21] Appl. No.: 928,110

[22] Filed: Aug. 12, 1992

[30] Foreign Application Priority Data

| Aug. 13, 1991 | [JP] | Japan | 3-228342 |
| Aug. 13, 1991 | [JP] | Japan | 3-228344 |
| Aug. 19, 1991 | [JP] | Japan | 3-231001 |

[51] Int. Cl.$^6$ .................................... F16H 1/32
[52] U.S. Cl. ............................ 475/178; 475/179
[58] Field of Search ............. 475/168, 178, 179, 176; 74/451

[56] References Cited

U.S. PATENT DOCUMENTS

| Re. 24,288 | 3/1957 | Nanni | 475/168 X |
| 3,430,523 | 3/1969 | Merritt | 475/168 |
| 4,297,920 | 11/1981 | Richter | 475/168 |
| 4,567,790 | 2/1986 | Butterfield et al. | 475/179 X |
| 4,825,727 | 5/1989 | Komuro | 74/421 X |
| 4,909,102 | 3/1990 | Haga | 475/168 |
| 5,123,884 | 6/1992 | Kondoh et al. | 475/168 X |
| 5,178,046 | 1/1993 | Matsumoto et al. | 475/178 X |
| 5,188,572 | 2/1993 | Yamaguchi et al. | 475/168 |
| 5,211,611 | 5/1993 | Lammers et al. | 475/178 |

FOREIGN PATENT DOCUMENTS

| 730526 | 8/1932 | France. | |
| 1165352 | 10/1958 | France. | |
| 63-243549 | 10/1988 | Japan | 475/168 |
| 403239842 | 10/1991 | Japan | 475/179 |

*Primary Examiner*—Dirk Wright
*Assistant Examiner*—Khoi Q. Ta
*Attorney, Agent, or Firm*—Nikaido, Marmelstein, Murray & Oram

[57] ABSTRACT

In an inscribed meshing planetary gear construction provided with a carrier pin (a carrier member) 116, rigidity and stability are improved and its entire length is shortened, resulting in that in particular, the connection between an input shaft 101 and an eccentric body 103 can be improved so as to reduce the number of component parts and the number of assembling steps. In order to realize this object, a flange part 114 of an output shaft 102, a carrier pin 116 and a support ring 117 are supported at both ends by a pair of bearings 115a and 115b, and then a reduction gear mechanism is disposed between bearings 115a and 115b. The input shaft 101 is formed with a D-cut part of cross section by cutting a part of its outer circumference in parallel with its axial direction. This cut part is utilized so as to set a circumferential position (a stop of rotation) between the input shaft 101 and an eccentric body 103. A carrier pin 116 has a pipe-like spacer 125 at its central part, the axial position of the flange part 114, the carrier pin 116 and the support ring 117 is set through a spacer 125.

4 Claims, 22 Drawing Sheets

INSCRIBED MESHING PLANETARY GEAR CONSTRUCTION

BACKGROUND OF THE INVENTION

1. Field of the Invention

This invention relates to an inscribed meshing planetary gear construction which is preferably applied to a speed increasing gear or a reduction gear, more particularly, a small-sized speed increasing gear or a reduction gear in which a high output torque is required.

2. Description of the Prior Art

In the prior art, it is widely known to provide a speed increasing gear or a reduction gear employing an inscribed meshing planetary gear construction comprising a first shaft, an external-tooth gear mounted (assembled) on the first shaft through a eccentric body in a state where the external-tooth gear can be rotated eccentric around the first shaft, an internal-tooth gear with which the external-tooth gear is inscribed and meshed, and a second shaft connected to the external-tooth gear through means for transmitting only the rotation component of the external-tooth gear.

An example of the prior art of this construction is shown in FIGS. 14 and 15. This prior art is constructed such that said first shaft is applied as an input shaft, said second shaft is applied as an output shaft and at the same time said construction is applied to a reduction gear by fixing the internal-tooth gear.

Eccentric bodies 3a, 3b are fitted to the input shaft 1 with a predetermined phase difference (180° in this example). The eccentric bodies 3a, 3b are integrated into one body. Two external-tooth gears 5a, 5b are placed on to each of these eccentric bodies 3a, 3b through eccentric bearings 4a, 4b. A plurality of inner roller holes 6 are provided in the external-tooth gears 5a, 5b and then an inner pin 7 and an inner roller 8 are fitted in these roller holes.

A main object of providing two external-tooth gears (in plural rows) is to increase a transmittance capacity, maintain a strength and keep a rotational balance.

External teeth 9 such as trochoidal teeth or circular teeth etc. are provided at outer circumferences of said external-tooth gears 5a, 5b. The outer teeth 9 are inscribed and meshed with the internal-tooth gear 10 fixed to a casing 12. The internal teeth of the internal-tooth gear 10 are constructed such that an outer pin 11 is loosely fitted to an inner pin hole 13 and held to be easily rotatable.

An inner pin 7 passing through said external-tooth gears 5a, 5b is tightly fitted to or fixed to a flange part 14 of the output shaft 2.

When the input shaft 1 is rotated once, the eccentric bodies 3a, 3b is also rotated once. The external-tooth gears 5a, 5b are apt to oscillatebly rotate around the input shaft 1 through this one revolution of the eccentric bodies 3a and 3b. However, since the rotation is restricted by the internal-tooth gear 10, the external-tooth gears 5a, 5b almost merely perform oscillation while being inscribed with the internal-tooth gear 10.

Now, it is assumed that the number of teeth of the external-tooth gears 5a, 5b is N and the number of teeth of the internal-tooth gear 10 is N+1, then the difference between the numbers of teeth is 1. Consequently, the external-tooth gears 5a, 5b are displaced by one tooth relative to the internal-tooth gear 10 fixed to the casing 12 every time the input shaft 1 is rotated. This means that one revolution of the input shaft 1 is decelerated to a revolution of −1/N of the internal-tooth gear.

Oscillation component of the external-tooth gears 5a, 5b is absorbed by clearances between the inner roller holes 6 and the inner pins 7 and then only the rotational component is transmitted to the output shaft 2 through the inner pins 7.

In this case, the inner roller holes 6a, 6b and the inner pins 7 (inner rollers 8) form an "isokinetic inscribed meshing mechanism".

As a result, finally, a reduction of reduction ratio −1/N can be accomplished.

In the example of this prior art, the internal-tooth gear of the inscribed meshing planetary gear construction is fixed, the first shaft is an input shaft and the second shaft is an output shaft. However, a reduction gear can also be constructed by fixing the second shaft and applying the first shaft as an input shaft and the internal-tooth gear as an output shaft. Furthermore, a speed increasing gear can also be constructed by reversing these inputs and outputs.

As described above, the inner pin 7 has a function to form an circular tooth acting as one of elements of said isokinetic inscribed meshing mechanism constructed with the inner roller holes 6a, 6b, and also has another function acting as a carrier member for transmitting a rotational force of a rotation of external-tooth gears 5a, 5b to the output shaft 2. In particular, in order to keep a superior former function, it was essential to provide the inner rollers 8 capable of being freely rotated around the outer circumference of the inner pins 7. The inner roller 8 shows a problem of expensive cost due to the fact that the material must be hard and both outer and inner circumferences thereof must be coaxially and accurately machined (processed or manufactured).

In view of this fact, an idea has been proposed that the function which forms a circular tooth of one of the elements of the isokinetic inscribed meshing mechanism and another function which acts as a carrier member for transmitting a rotational force of the external-tooth gears 5a, 5b to the output shaft 2 are separated, and even if the inner roller 8 is eliminated, it has a similar performance to that of having the inner roller 8.

This structure is illustrated in FIGS. 17 and 18.

This structure comprises, as means for transmitting a rotational component of the external-tooth gears, the inner pin 7 capable of constructing the isokinetic inscribed meshing mechanism relative to the inner pin holes (corresponding to the inner roller holes) 19a, 19b arranged in the external-tooth gears 5a, 5b, an annular support ring 17 receiving a rotation corresponding to the rotational component of the inner pin 7 (=the rotational component of the external-tooth gears), and a carrier pin 16 projected from the flange part 14 formed at the output shaft 2, connected and fixed to the support ring 17.

Said inner pin 7 is rotatably fitted to the flange part 14 and the support ring 17 through bushes 18a, 18b. That is, since the inner pin 7 is not necessarily tightly connected to the output shaft 2 due to the presence of the carrier pin 16, it can be constructed to be rotatable, resulting in that the prior art inner roller 8 can be eliminated: Said annular support ring 17 is assembled to an extremity end portion of said carrier pin 16. Since the carrier pin 16 only has a function to transmit a rotational force of the support ring 17 to the output shaft, there are provided big through-holes 20a, 20b which do not interfere with the carrier pin 16 even if the carrier pin 16 oscillates at the corresponding portion on the external-tooth gears 5a, 5b.

Incidentally, in FIG. 17, reference numerals 15a, 15b denote bearings of the output shaft 2. Reference numeral 21 denotes an inner pin keep plate for determining an axial position of the inner pin 7. Reference numeral 23 denotes an inner pin keep bolt. Reference numeral 22 denotes a steel plate race.

Although the prior art illustrated in FIGS. 14, 15 and FIGS. 17, 18 is "an inscribed meshing planetary gear construction" having two external-tooth gears, it is apparent that more simple type having one external-tooth gear may also be presented. This example is illustrated in FIGS. 19 and 20. However, as the inscribed meshing planetary gear construction, it is quite similar to those illustrated in FIGS. 14, 15 and FIGS. 17, 18, so that similar locations are merely denoted by reference symbols having no suffixes a and b and their duplicate description will be eliminated.

By the way, it is normal that a speed increasing gear or reduction gear having the aforesaid inscribed meshing planetary gear construction has a transmitting capacity of about 0.1–160 KW. When a transmitting capacity is lower than the former, it is normal that a parallel axis type gear reduction gear having a normal involute gear teeth is applied. Because, in this case, a part of the reduction gear mechanism can be made compact as compared with a size of a motor without depending on the inscribed meshing planetary gear construction (an outer diameter of the part of the reduction gear mechanism can easily be the same diameter in respect to an outer diameter of the motor).

An example of a geared motor 40 is illustrated in FIGS. 22–24, which is integrally constructed with the motor using the well-known parallel axis gear reduction gear mechanism. FIG. 22 is a front elevational view, and FIG. 23 is a side elevational view as viewed from an installing surface 42. FIG. 24 is a sectional view showing a gear reduction gear mechanism part 44 as a developed section.

However, as apparent from FIGS. 14, 17 and 19, this prior art type reduction gear was constructed such that a variation of load generated at the reduction gear mechanism part or an external radial load from a mating mechanism acting against the output shaft 2 was supported by a pair of bearings 15a and 15b supporting output shaft 2, so that it is need in generally that a Y segment in each of the figures was elongated and an X segment was shortened as much as possible in order to increase a supporting stability.

However, there was a problem that the X segment was hardly shortened and the Y segment was necessarily elongated, resulting in that the axial length of the reduction gear was elongated.

In addition, in case of a structure shown in FIGS. 17 and 18, a carrier member 16 was integrally formed with the output shaft 2, resulting in that there was also a problem that the manufacturing was quite difficult, required a high cost and then an effect of cost reduction caused by elimination of inner rollers 8 was eliminated..

Furthermore, in order that the inner pins 7 were supported and free rotate, an inner pin pressing plate 21, a steel plate ring 22 and inner pin pressing bolts 23 and the like were essential, resulting in that there was also a problem that the number of component parts and the number of assembling steps were increased.

On the other hand, in case of the structure shown in FIG. 21 in which the reduction gear shown in FIGS. 19 and 20 was fixed at its flange, the aforesaid problem was present as it was, and at the same time, since it had a double-flange structure in the casing 12 in which a distance Z between an installing flange 36 for the mating machine and a flange 37 for fixing an internal-tooth gear was elongated due to a requirement of the elongated Y segment, resulting in that, for example, when this structure was made by aluminum die-cast, or aluminum casting, the mold was complicated, the manufacturing was difficult and expensive.

In addition, in this kind of prior art inscribed meshing planetary gear construction including the aforesaid prior example, a connection between the input shaft 1 and eccentric bodies 3 or 3a, 3b was carried out under a combination of a key 30 and key-ways 31 and 32 (refer to FIGS. 19 and 20), resulting in that there was a problem that the number of machining steps and the number of component parts were increased and the end mill machining was required, so that an efficiency of the manufacturing was poor and a mass productivity was low.

In addition, there was a problem that a concentration of stress could easily be generated at the key-ways 31 and 32. Due to this fact, there was a requirement that the diameter of the input shaft 1 be made large as much as possible. However, there was a substantial restriction on an expansion of an outer diameter of the eccentric body in order to realize a compact characteristic of a speed increasing gear or reduction gear in the diametrical direction, and further there was a limitation in increasing in a diameter of the input shaft due to a requirement of assuring a wall thickness of the key-way 32.

By the way, as a method for position setting in the circumferential direction (stopping of rotation) of substantial coaxial two members, it is known as a general well-known technology in which a part of an outer circumference of an inner member is cut in parallel with an axial direction to form a cut part having about a D-shaped cross section, and this cut part is utilized to set a position of circumferential direction between the inner member.

However, in the case where such a structure as above is employed as a circumferential position setting structure between the input shaft 1 and the eccentric bodies 3, 3a and 3b of this kind of inscribed meshing planetary gear construction, a bearing 35 (in general, a ball bearing is utilized in view of a cost) at the output shaft must be necessarily a bearing of small diameter in which it inscribes against a flat surface of the cut part, it may not be allowed in view of its strength. As regards this matter, it may also be proposed that an inner diameter of the bearing 35 has the same diameter as that of the input shaft 1 and a filling material is enclosed at the cut part. However, this structure was not appropriate as a bearing structure for the input shaft 1 to which a force of radial direction was always applied due to an eccentric rotation of the external-tooth gear or bending of the output shaft.

That is, it was a practical situation in the prior art that this "method of cutting a part of an outer circumference of the input shaft in parallel with its axial direction" was hardly employed as a structure to be applied to this kind of inscribed meshing planetary gear construction.

The small sized geared motor using the parallel axis gears shown in FIGS. 22 and 24 was hardly used due to the fact that it could not get a high output torque and it was difficult in view of its structure that the motor (the input shaft 1) and the output shaft 2 were concentrically arranged as shown in FIG. 24.

There was a problem that a centering location and a fixing of the motor were hard due to the fact that the motor (the input shaft 1) and the output shaft 2 were not concentric and no fitting parts concentric with the output shaft 3 was prepared at the reduction gear mechanism.

The present first invention has been constructed in view of the aforesaid various problems of the prior art and it is an object of the present invention to provide an inscribed meshing planetary gear construction comprising;

the first shaft, an external-tooth gear placed on an eccentric axis on the first shaft through an eccentric body attached to the first shaft, an internal-tooth gear with which the external-tooth gear is inscribed and meshed, and the second shaft connected to the external-tooth gear through means for transmitting only a rotational (tangential) component of the external-tooth gear, wherein as means for said transmitting the rotational component, there are provided inner pins capable of forming an isokinetic inscribed meshing mechanism in respect to inner pin holes disposed in the external-tooth gear, an annular support ring for receiving a rotation corresponding to the rotational component of the external-tooth gear through the inner pins, and a carrier member projected from a flange part formed in the second shaft, connected and fixed to the support ring.

In the above construction, the annular support ring and the flange part of the second shaft are disposed while holding the external-tooth gear therebetween, and both the support ring and the flange part are supported at both ends to a casing through a pair of bearings. The carrier member is separated from the support ring and the flange part and formed in a substantial column-like shape. A pipe-like spacer is press fitted in advance at a center position of the carrier member. Both ends of the carrier member are press fitted to the support ring and the flange part. And axial position of the support ring, the carrier member and the flange part is set through the spacer.

Said inner pins may be freely fitted to the support ring and flange part.

Further, it is an object of the present second invention to overcome the aforesaid problem by arranging an inscribed meshing planetary gear construction comprising;

the first shaft, an external-tooth gear placed on an eccentric axis on the first shaft through an eccentric body attached to the first shaft, an internal-tooth gear with which the external-tooth gear is inscribed and meshed, and the second shaft connected to the external-tooth gear through means for transmitting only a rotational component of the external-tooth gear, wherein as means for transmitting said rotational component, there are provided inner pins capable of forming an isokinetic inscribed meshing mechanism in respect to inner pin holes placed in the external-tooth gear, an annular support ring for receiving a rotation corresponding to the rotational component of the external-tooth gear through the inner pins, and a carrier member projected from a flange part formed in the second shaft, connected and fixed to the support ring.

In the above construction, the annular support ring and the flange part of the second shaft are attached while holding the external-tooth gear therebetween, and both the support ring and the flange part are supported at both ends to a casing through a pair of bearings. The carrier member is separated from the support ring and the flange part and formed in a substantial column-like shape. A pipe-like spacer is press fitted in advance at a center position of the carrier member. Both ends of the carrier member are freely fitted to the support ring and the flange part. Axial position of the support ring, carrier member and flange part is set by holding the flange part, spacer and support ring by means of a stopper ring means attached at one end of the carrier member and a screw-nut means attached at the other end of the carrier member.

Said inner pins may be loosely fitted to the support ring and flange part, their axial position is set by either the inner rings or outer rings of the pair of bearings.

It is an object of the present third invention to overcome the aforesaid problem by arranging an inscribed meshing planetary gear construction comprising; the first shaft, an external-tooth gear placed on an eccentric axis on the first shaft through an eccentric body attached to the first shaft, an internal-tooth gear with which the external-tooth gear is inscribed and meshed, and the second shaft connected to the external-tooth gear through means for transmitting only a rotational component of the external-tooth gear, wherein as means for said transmitting the rotational component, there are provided inner pins capable of forming an isokinetic inscribed meshing mechanism in respect to inner pin holes disposed in the external-tooth gear, an annular support ring for receiving a rotation corresponding to the rotational component of the external-tooth gear through the inner pins, and a carrier member projected from the flange part formed in a second shaft, connected and fixed to the support ring.

In the above construction, the annular support ring and the flange part of the second shaft are connected while holding the external-tooth gear therebetween, and both the support ring and the flange part are supported at both ends to a casing through a pair of bearings. A part of an outer circumference of the first shaft is cut in parallel with its axial direction to form a cut part having the cross sectional shape of about D-shape, and this cut part is utilized to define a positioning in the circumferential direction of each of the first shaft and the eccentric body.

In this case, an inner diameter of the bearing of the first shaft facing to the second shaft may be set to be slightly smaller than an outer diameter of the first shaft, and then a filling material is enclosed at a slight remained cut part.

It is an object of the present fourth invention to overcome the aforesaid problem by arranging an inscribed meshing planetary gear construction comprising a first shaft, an external-tooth gear placed on an eccentric axis on the first shaft through an eccentric body attached to the first shaft, an internal-tooth gear with which the external-tooth gear is inscribed and meshed, and a second shaft connected to the external-tooth gear through means for transmitting only a rotational component of the external-tooth gear, wherein as means for said transmitting the rotational component. There are provided inner pins capable of forming an isokinetic inscribed meshing mechanism in respect to inner pin holes disposed in the external-tooth gear, an annular support ring for receiving a rotation corresponding to the rotational component of the external-tooth gear through the inner pins, and a carrier member projected from a flange part formed on the second shaft, connected to and fixed to the support ring.

In the above construction, the annular support ring and the flange part of the second shaft are attached while holding the external-tooth gear therebetween, and both the support ring and the flange part are supported at both ends at a casing through a pair of bearings. A square-shaped installing flange and a circular part for centering location are formed in the second shaft side of the casing in concentric with the second shaft and in concentric with the first shaft. And installing bolt holes are placed near a top point of the square-shaped installing flange.

In the present first to fourth inventions, the carrier member is passed through the external-tooth gear and attached hold the external-tooth gear with the annular support ring and the flange part of the second shaft, and both the support ring and the flange part are supported at both ends at a casing through a pair of bearings. As a result, it is possible to remarkably improve rigidity and stability of a reduction gear mechanism.

In the present first invention, as a structure for connecting and position setting the flange part, carrier member and support ring, the carrier member is separated from the support ring and the flange part and substantially formed into a column shape, and at the same time, a pipe-like spacer is press fitted in advance at a center position of the carrier member, thereafter both ends are press fitted to the support ring and flange part, so that an axial position of the support ring, carrier member and flange part is set through the spacer.

As a result, it is not necessary to make an integral projection of the carrier member from the flange part as found in the prior art, and not necessary to manufacture a complex structural member ranging from the flange part to the carrier member, and thus a cost can be substantially reduced. In addition, since the carrier itself is a structure in which a pipe-like spacer is fitted into a simple column-like shape; resulting in that the manufacturing is quite easy, and at the same time the strength and accuracy may become superior.

That is, if the carrier member itself is formed to have a stage which is found in a coupling structure between the support ring and the carrier member as found in the prior art, the manufacturing is difficult and the accuracy is hardly attained. Furthermore, a stress may easily be concentrated at a part indicated by a reference symbol P1 in FIG. 16. In addition, in order to eliminate this problem, it is necessary to make a round R at the part of said P1, and in this case, it is necessary to make a chamfer corresponding to the side of the support ring. However, since it is necessary to make a chamfer at a part of a stage indicated by a reference symbol P2, only a range L1 can contribute to an axial position setting. Therefore, in order to keep this range L1 as long as possible, it is necessary to increase a large diameter D1 or to decrease a small diameter D2, resulting in that there is a problem that the weight is increased or the strength is decreased.

To the contrary, the present first and second inventions are constructed in such a manner that a pipe-like spacer is merely fitted to a column-like carrier member, so that a concentration of stress is hardly produced, an entire thickness of the pipe can be utilized to set an axial position, and further an entire length (an axial length) of many the pipes can be easily arranged. And then, axial positions of a plurality of carrier members can easily be set.

Constitution described in the present first invention aims at an application to a so-called maintenance free small-sized speed increasing gear or reduction gear under an assumption that it is not frequently decomposed after once assembled.

Accordingly, the carrier member, flange part and support ring are connected by the most simple press-fitting so as to realize a low cost.

In this case, the structure can be simplified by press fitting the inner pins also into the flange and the support ring, resulting in that a more low cost can be attained.

On the other hand, construction described in the present second invention aims at an maintenance or repairing through the decomposition. Accordingly, it has a structure in which the flange part, a spacer for the carrier member and the support ring are held and fixed by the stopper ring means and the screw-nut means. The reason why the stopper ring means is employed consists in the fact that a stress is concentrated at the stage part if the carrier member having a stage part is employed, and that the staged member can not be machined by a so-called coreless grinding plate. Therefore, the cost is expensive and a high accurate machining can not be carried out.

In this case, in view of the decomposition, if inner pins are freely fitted to the flange part and the support ring, and an axial position is set by a pair of bearings holding the flange part and the support ring, the structure can be simplified and the inner pins can be freely rotated.

In the present third invention, similar to the present first and second inventions, a carrier member passes through the external-tooth gear and is disposed so that the external-tooth gear is held by the annular support ring and the flange part of the second shaft, and further both the support ring and the flanger part are supported at both ends at a casing through a pair of bearings. As a result, rigidity of the reduction gear mechanism, in particular, rigidity and stability in respect of the radial direction can be improved.

Due to employment of this construction, it becomes possible to make an inner diameter of the bearing of the second shaft smaller, and a part of an outer circumference can be cut in parallel with an axial direction of the first shaft to enable D-shaped cut part.

By forming the same shape hole including the cut part in the eccentric body, a position setting in the circumferential direction (stopping of rotation) can be obtained.

Since the structure for preventing the rotation can be employed, the cut part line between the first shaft and the eccentric body are changed from an acute angle (prior art) to an obtuse angle (third invention) so that a concentration of stress hardly occurs. Also, since a key which restricts a minimum thickness of the eccentric body is not present, it becomes possible to increase a diameter of the first shaft and at the same time it becomes possible to decrease an outer diameter of the eccentric body. Therefore, the load capacity can be increased or a more small sized eccentric body can be used in response to the application.

In the prior art, since the machining of key-way in the first shaft had to be cut by an end mill whereby a machining efficiency was quite inferior and a mass productivity was poor. However, in the case where a D-shaped cut part is formed, after many input shafts are arranged, and then the cut part is formed by a broach machining whereby the machining efficiency can be remarkably improved and the mass productivity is further improved. As a result, a further cost-reduction can be attained.

Also, the number of component parts can be naturally decreased in correspondence with no presence of key, so that the number of assembling operations can be reduced.

Although there is no special problem even if an inner diameter of the bearing of the first shaft facing to the second shaft is completely smaller diameter than that of a flat surface of the cut part due to said both supporting structures, it may be slightly lower set than that of an outer diameter of the first shaft (to a degree in which the cut part is slightly remained) and a filling material may be filled in the cut part slightly remained.

With such an arrangement, it becomes possible to present a reduction in strength of the bearing at the second shaft from increasing.

As a filling material, either resin or solder or the like can be applied.

Lastly, in the fourth present inventions, similar to the present first to third inventions, basically employed an inscribed meshing planetary gear construction, not so-called parallel axis gear structure, and then the carrier member passes through the external-tooth gear so that the external-tooth gear is held by the annular support ring and the flange part of the second shaft, and both the support ring and the flange part are supported at both ends at a casing through a pair of bearings. As a result, rigidity of the reduction gear mechanism, in particular, rigidity and stability against a radial direction can be remarkably improved. In addition, the flange for fixing the internal-tooth gear and the flange for installing to the mating machine can be integrally formed whereby the machining can be easily attained, the low cost and reduction in the axial direction size can be realized.

Furthermore, in the present fourth invention, the casing facing to the second shaft is formed with a square-shaped installing flange part as means for fixing to the mating machine, and installing bolt holes are disposed near a top part of the square-shaped installing flange. As a result, due to the both ends supporting structure, double-flange structure can be avoided, and at the same time a structure of the casing at the second shaft can be made quite simple, and then a smaller size and a lower cost than the prior art can be realized.

In addition, since this installing flange part has a square shape, "a seat setting" as a simple reduction gear machine under a state before being fixed to the mating machine is superior, and it may not roll, resulting in that it has an advantage that it may easily be handled.

With such a construction described above, the present invention may provide a small-sized device, high output and further the first shaft and the second shaft (in general, the input shaft and the output shaft) can be concentrically made, resulting in that a centering and a fixing to the mating machine could easily be carried out under a presence of a fitting part formed in concentric with the second shaft.

In this way, according to the present invention (first to the fourth inventions), since the reduction gear mechanism is supported at both ends by a pair of bearings, and an entire length of the reduction gear machine can be shortened, and its structure is quite simple and it can be assembled with high accuracy while it has a construction comprising a support ring and a carrier member. In addition, an assembling structure of each of the inner pins is quite simple, so that entirely the high accuracy and a low cost can be obtain. As a result, a connecting structure between the first shaft and an eccentric body can be rationally improved, resulting in that entirely a high strength and a low cost can be obtained. In addition, employing this construction eliminates a double flange of the casing at the second shaft side so that the manufacturing of the casing at the output part can easily be performed in a low cost. In addition, although the first shaft, the second shaft, fitted part around the second shaft and installing bolt holes are concentrically arranged, so that centering and fixing of them to the mating machine can be quite easily be performed.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Figure 1:
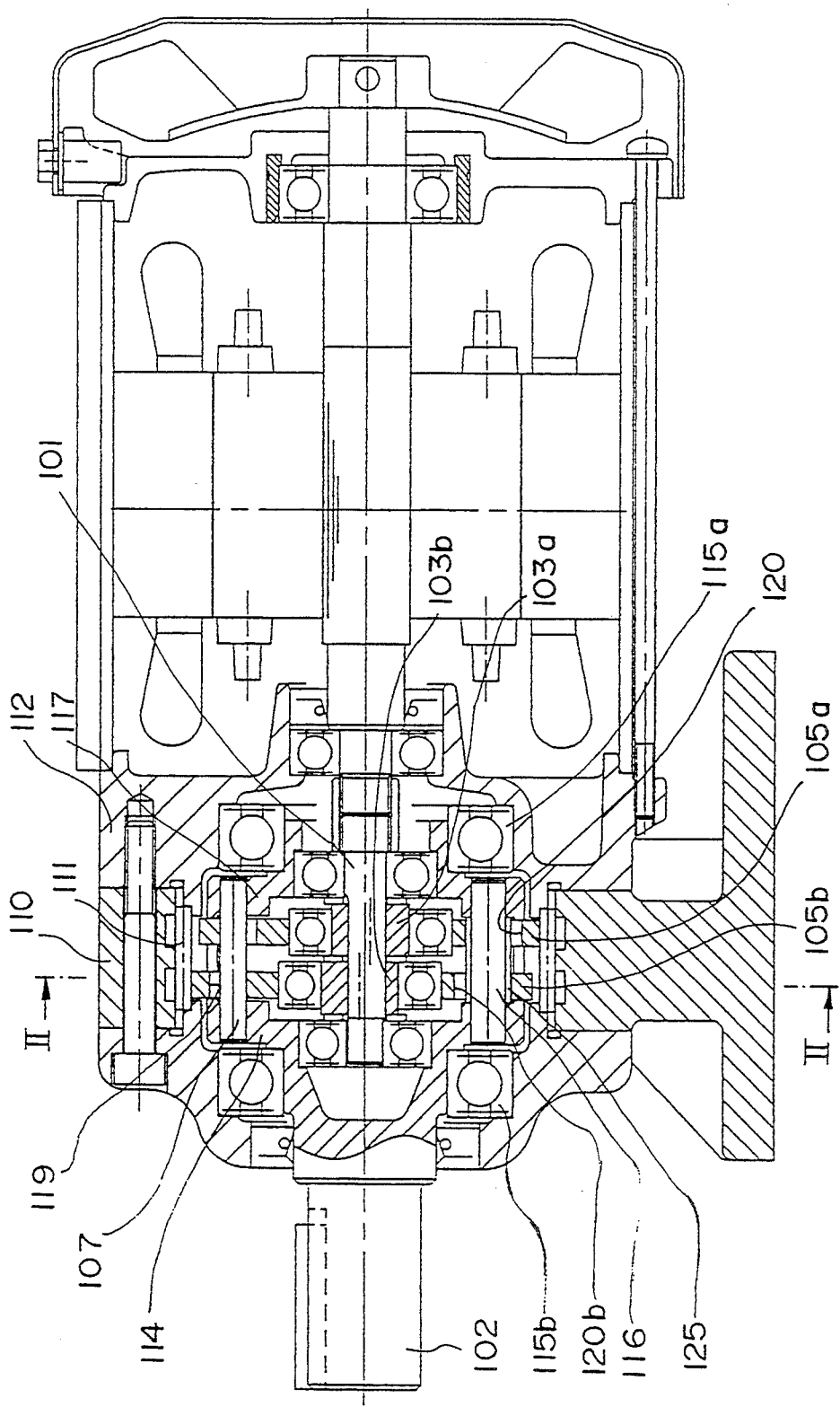
FIG. 1 is a sectional view showing a reduction gear to which an inscribed meshing planetary gear construction is applied according to the present first invention.

Referring now to the drawings, some preferred embodiments of the present invention will be described in detail.

Figure 2:
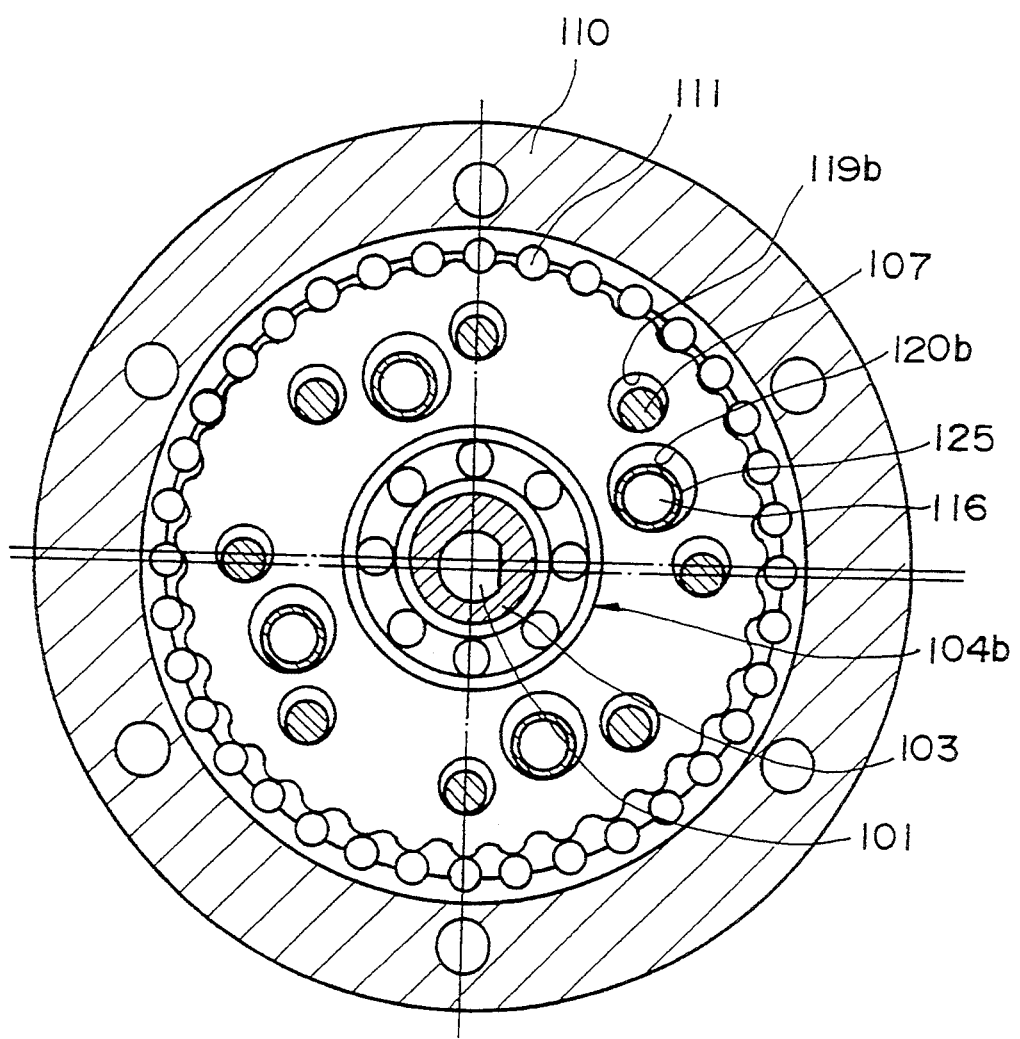
FIG. 2 is a sectional view taken along a line II—II of FIG. 1.

FIG. 1 is a sectional view showing a reduction gear to which an inscribed meshing planetary gear construction of the present first invention is applied, and FIG. 2 is a sectional view taken along a line II—II of FIG. 1.

In the following description, the same or similar parts as or to those of the construction of the well-known example already described are denoted by the same latter two-digit numbers.

One end of each of carrier pins (carrier members) 116 which is separated from the flange part 114 is fitted (press fitted) to the flange part 114 of the output shaft 102. The support ring 117 is fitted (press fitted) to the other end of the carrier pin 116, and then "a carrier" is constructed by the support ring 117 and the carrier pin 116.

The flange part 114, the carrier pins 116 and the support ring 117 are supported at both ends at the casing 112 by the pair of bearings 115a and 115b.

The pipe-like spacer 125 is fitted (press fitted) at a central part of the carrier pin 116. Accordingly, even if there is a slight difference in a fitting depth of the carrier pin 116 into the support ring 117 or into the flange part 114, a distance between the support ring 117 and the flange part 114 is always kept constant under a function of this spacer 125 without failing, and further the same distance can be assured at portions of all (4) carrier pins 116.

The external-tooth gears 105a and 105b are formed with carrier pin holes (through-holes) 120 through which the carrier pins 116 are passed. Size of each of the carrier pin holes 120 is set in such a manner that the carrier pins 116 are not contacted with the external-tooth gears 105a and 105b even if the external-tooth gears 105a and 105b are oscillated.

The inner pins 107 are press fitted to the support ring 117 and the flange part 114. Accordingly, their free rotation can not be performed. However, due to the facts that 1) since each of the inner pins is a simple column-like shape, a mirror surface finishing can be easily (at a low cost) with a hard raw material;

2) since a reduction gear mechanism is held by the pair of bearings 115a and 115b, an entire rigidity can be quite improved and inner pins 107 can be supported under a quite stable state; and 3) since a construction in which the inner pins 107 and the carrier pins 116 are separated, a radial load applied from the output shaft or the like is received by the carrier pins 116, no strong radial load is applied to the inner pins 107, so that they can be supported in a more stable condition; even if the inner rollers are practically eliminated and the inner pins 107 can not rotate, there is no problem at all. However, the inner pins 107 is not necessary to be press fitted, it may be freely fitted.

Action of this preferred embodiment will be described as follows.

It is quite similar action to that of the prior art well-known example that the external-tooth gears 105a and 105b are oscillatably rotated together with a rotation of the input shaft 101, and the rotation of input shaft 101 becomes a reduced rotation (rotational) of the external-tooth gears 105a and 105b according to an engagement (meshing) between the outer pins 111 corresponding to the inner teeth of the internal-tooth gear 110 and the external-tooth gears 105a and 105b.

Rotation of the external-tooth gears 105a and 105b is absorbed at their oscillating components by clearances between the inner pin holes 119 and the inner pins 107, and only a rotational component is transmitted to the flange part 114 of the output shaft 102 and the support ring 117 through the inner pins 107. The rotational force transmitted to the support ring 117 is transmitted to the output shaft 102 through the carrier pin 116.

Since the external radial load acting against the output shaft 102 is received at both ends by the bearing 115a, and by the bearing 115b through the carrier pins 116 and the support ring 117, the external radial load does not influence against the inner pins 107.

According to this preferred embodiment, since the reduction gear mechanism is supported at both ends by a pair of bearings 115a and 115b, it may provide some effects that a quite high rigidity can be attained, a connection among the flange part 114, the carrier pins 116 and the support ring 117 can be performed quite simply and at a high accuracy, the inner rollers in the inner pins 107 may also be eliminated to attain a low cost.

Figure 3:
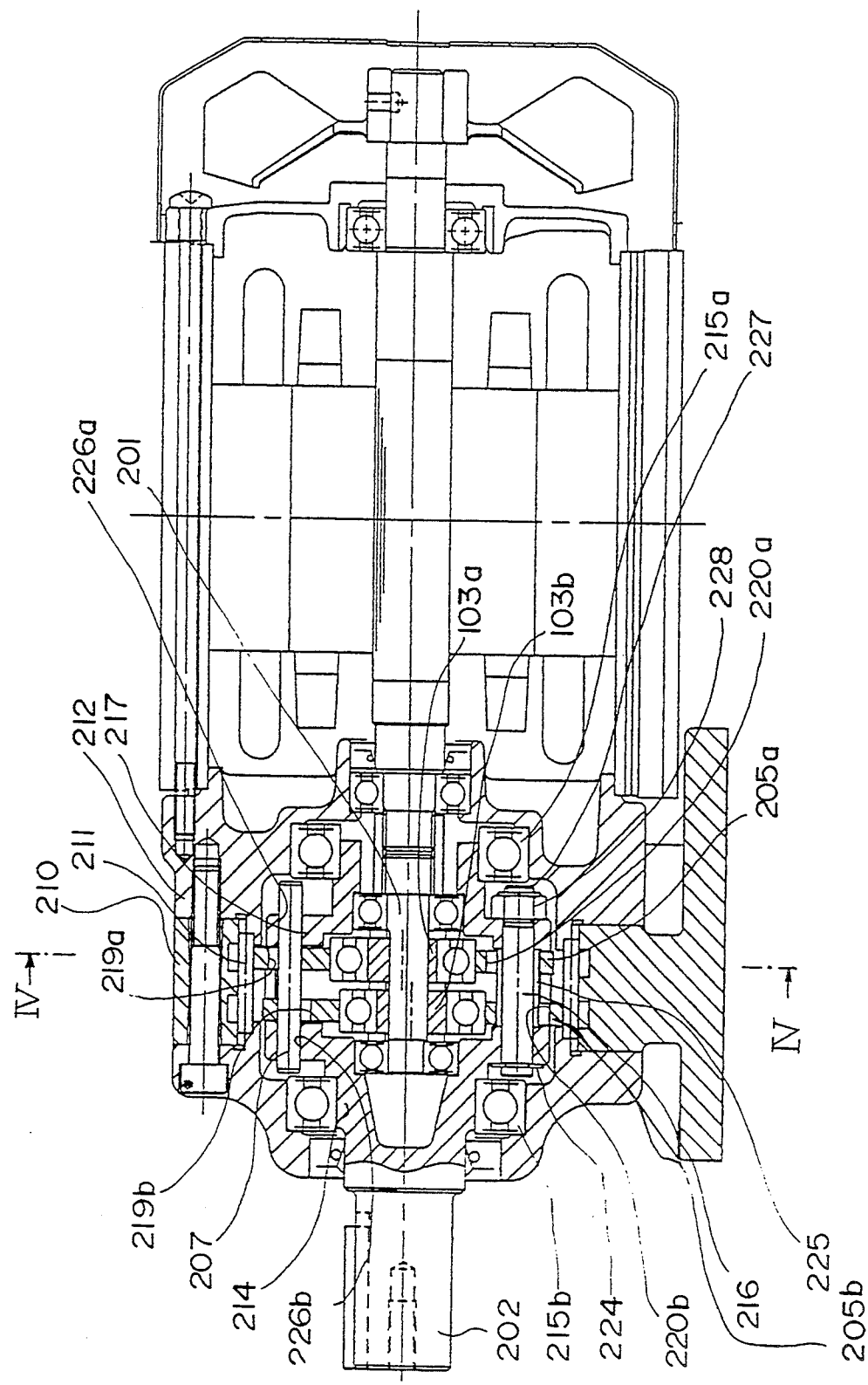
FIG. 3 is a sectional view showing the preferred embodiment of the present invention.
Figure 4:
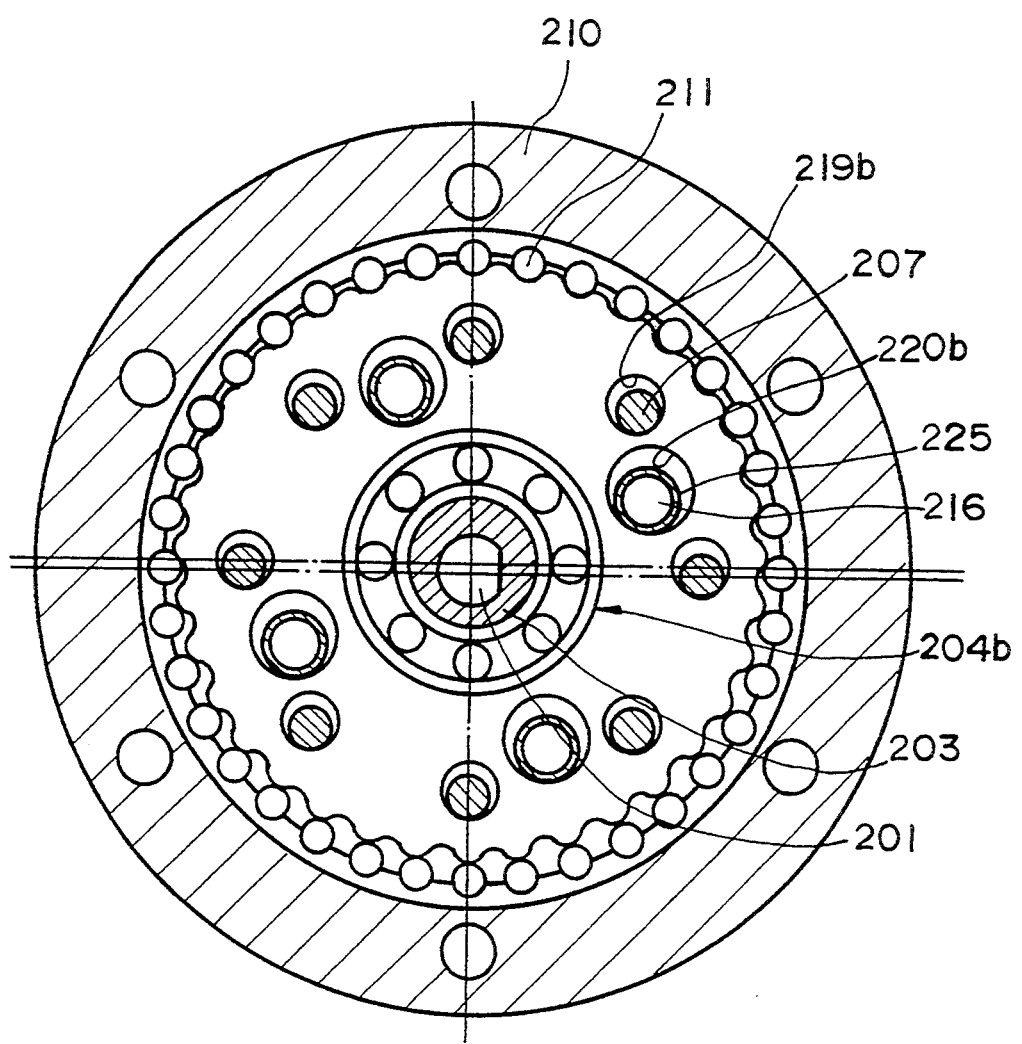
FIG. 4 is a sectional view taken along a line IV—IV of FIG. 3.

Then, FIGS. 3 and 4 show a preferred embodiment (the second invention) under an assumption that frequent decomposition and assembling operation are carried out. In this preferred embodiment, a stopper ring 224 is disposed at one end of the carrier pin 216, a threaded part 227 is disposed at the other end of the carrier pin. A flange part 214, a spacer 225 and a support ring 217 are strongly held by the stopper ring 224 and a nut 228 threadably engaged with the threaded part 227 to assemble them. Accordingly, their decomposition and assembling can be carried out at any number of times.

In addition, the carrier pin 216 is not a so-called staged bolt, but the stopper ring 224, so that it is possible to prevent any concentration of stress at this staged part. In the case where the staged carrier pin is employed, a so-called core-less grinder may not be applied for its machining operation, so that the high cost and a low accuracy may not be avoided. However, in this preferred embodiment, since the stopper pin 224 is employed, the machining with a core-less grinder can be utilized, and then a low cost and a high accuracy can be realized.

Incidentally, in this preferred embodiment, inner pins 207 are freely fitted in the inner pin holding holes 226a and 226b at the flange part 214 of the output shaft 202 and the support ring 217. Due to this fact, it can be freely rotated, thereby a sliding generated between the inner pin holes 219a, 219b and the inner pins 207 may well be absorbed. Decomposition at this time may also be carried out.

Since the inner pins 207 are freely supported at both ends, elastic deformation may easily be generated when they receive a load from inner pin holes 219a and 219b, thereby an error caused by machining and assembling, or decomposition and reassembling may well be absorbed. In addition, even if the inner pins 207 are elastically deformed, rigidity of an entire reduction gear is not assured by the inner pins 207, but by the flange part 214, the carrier pins 216 and the support ring 217 supported at both ends by the casing 212, resulting in that a quite stable operation can be continued.

Although the inner pins 207 are freely supported at both ends, their axial positions are set by outer rings 225a and 225b of the bearings 215a and 215b, so that the inner pins 207 are not pulled out.

Since other constructions are substantially similar to that of aforesaid prior art or aforesaid preferred embodiment, the repeat description will be eliminated by using the same latter two-digit numbers in the figures.

Figure 5:
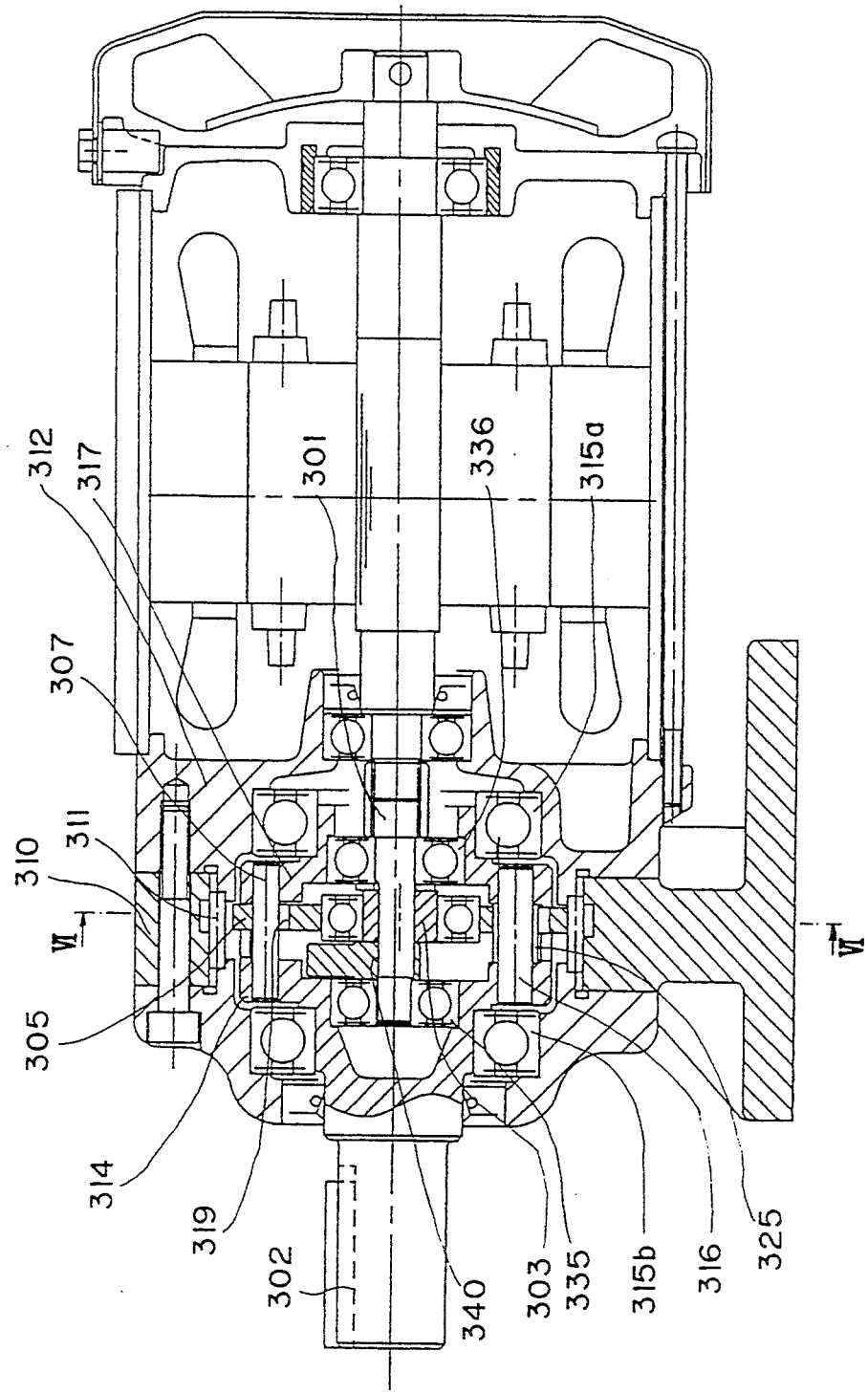
FIG. 5 is a sectional view showing a reduction gear to which an inscribed meshing planetary gear construction is applied according to the present third invention.
Figure 6:
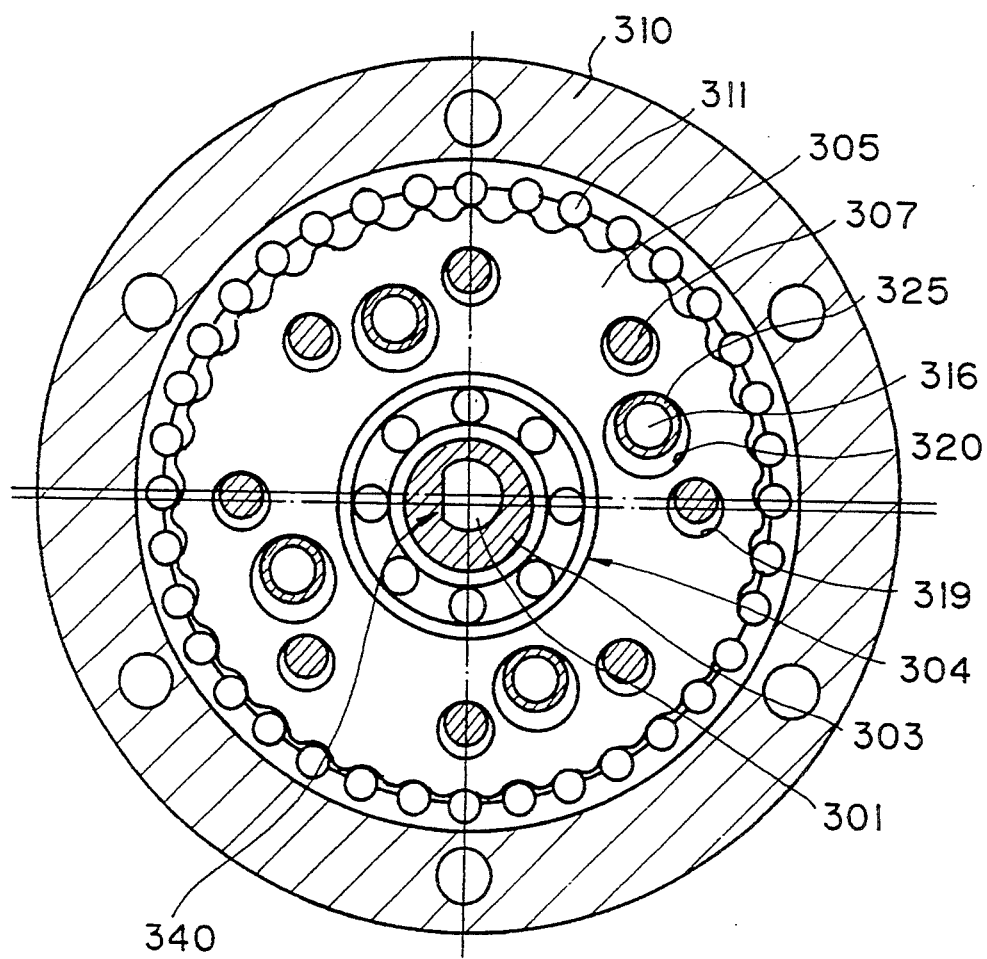
FIG. 6 is a sectional view taken along a line VI—VI of FIG. 5.

Next, FIG. 5 is a sectional view showing a reduction gear to which an inscribed meshing planetary gear construction of the present third invention is applied, and FIG. 6 is a sectional view taken along a line VI—VI of FIG. 5.

One end of each of carrier pins (carrier members) 316 which is separated from the flange part 314 is fitted (press fitted) to the flange part 314 of the output shaft 302. The support ring 317 is fitted (press fitted) to the other end of the carrier pin 316, and then "the carrier" is constructed by the support ring 317 and the carrier pin 316.

The flange part 314, the carrier pins 316 and the support ring 317 are supported at both ends at the casing 312 by the pair of bearings 315a and 315b.

The pipe-like spacer 325 is fitted (press fitted) at a central part of the carrier pin 316. Accordingly, even if there is a slight difference in a fitting depth of the carrier pin 316 into the support ring 317 or into the flange part 314, a distance between the support ring 317 and the flange part 314 is always kept constant under a function of this spacer 325 without failing, and further the same distance can be assured at portions of all (4) carrier pins 316.

Figure 7:
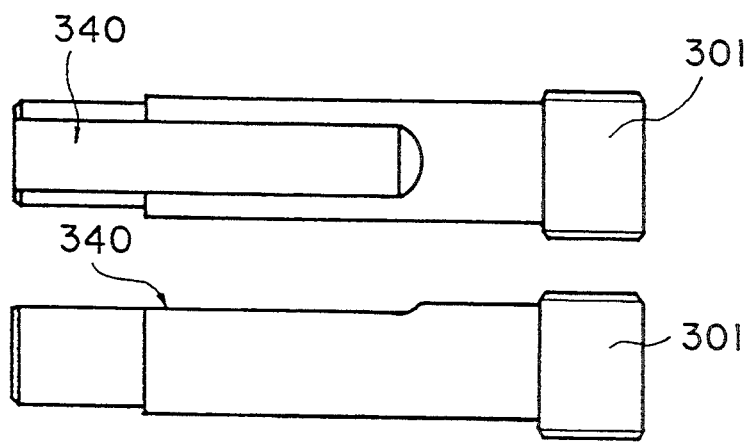
FIG. 7 is a front elevational view and a top plan view of an input shaft.
Figure 8:
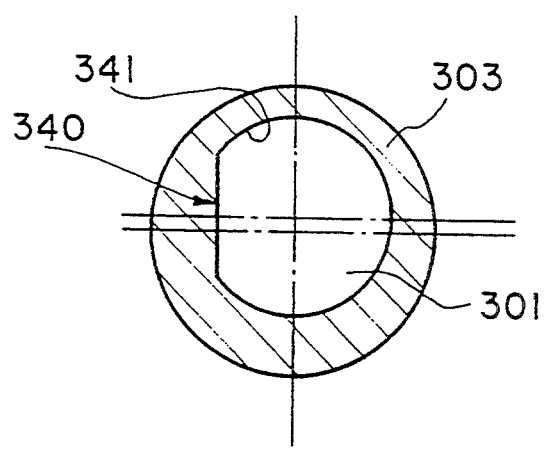
FIG. 8 is a sectional view showing a relation between an input shaft and an eccentric body.

As shown in FIGS. 7 and 8, a part of an outer circumference of the input shaft 301 is cut in parallel with an axial direction, and then a cut part 340 having a about D-shaped form of cross section is made. The eccentric body 303 is provided with holes 341 having the same shape as that of a cross sectional shape of the input shaft 301 including a shape of the cut part 340, and then a position of setting in an axial direction (a stopper of rotation) between the input shaft 301 and the eccentric body 303 is defined under the fitting of the holes 341 (FIG. 8).

A relation between an eccentric direction of the eccentric body 303 and a position of the cut part, it may be defined in reference to a strength and a common utilization (in particular, in the case where many external-tooth gears are employed in a reduction gear).

Figure 9:
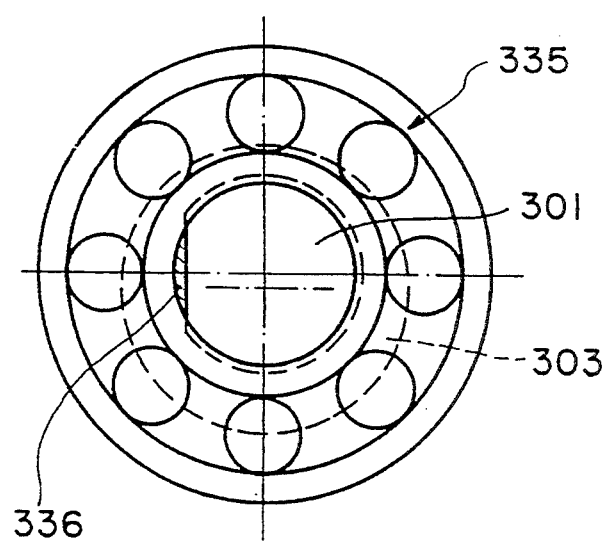
FIG. 9 is a sectional view showing a relation among an input shaft, an eccentric body and a bearing at an output shaft side.

An inner diameter of a bearing 335 of the input shaft 301 at the output shaft side is formed slightly smaller than an outer diameter of the input shaft 301 and then a filling material 336 such as resin or solder or the like is enclosed in the remained cut part (a part hatched in FIG. 9). This aims at keeping an inner diameter of the bearing 335 at the output shaft side as large as possible and aims at an avoidance of reduction of strength under a presence of the cut part as well as aims at a restriction of immersion of dusts or iron powder into this part.

The inner pins 307 are press fitted to the support ring 317 and the flange part 314. Accordingly, their free rotation can not be performed. However, due to the facts that 1) each of the inner pins is a simple column-like shape, and a mirror surface finishing can be easily (at a low cost) with a hard raw material;
2) a reduction gear mechanism is held by the pair of bearings 315a and 315b so as to support it at both ends, and then an entire rigidity can be quite improved and inner pins 307 can be supported under a quite stable state; and
3) a construction in which the inner pins 307 and the carrier pins 316 are separated, a radial load applied from the output shaft or the like is received by the carrier pins 316, no strong radial load is applied to the inner pins 307, so that they can be supported in a more stable condition; even if the inner rollers are practically eliminated and the inner pins 307 can not rotate, there is no problem at all. However, the inner pins 307 are not necessary to be press fitted, but may be freely fitted.

Action of this preferred embodiment will be described as follows.

First it is quite similar action to that of the described example that the external-tooth gear 305 is oscillatably rotated together with a rotation of the input shaft 301, and the rotation of input shaft 301 becomes a reduced rotation of the external-tooth gears 305 according to an engagement (meshing) between the outer pins 311 corresponding to the inner teeth of the internal-tooth gear 310 and the external-tooth gear 305a.

Next, rotation of the external-tooth gear 305 is absorbed at their oscillating components by clearances between the inner pin holes 319 and the inner pins 307, and only a rotational component is transmitted to the flange part 314 of the output shaft 302 and the support ring 317 through the inner pins 307. The rotational force transmitted to the support ring 317 is transmitted to the output shaft 302 through the carrier pin 316.

Since the external radial load acting against the output shaft 302 is received at both ends by the bearing 315a, and by the bearing 315b through the carrier pins 316 and the support ring 317, the external radial load may not influence against the inner pins 307. This action is quite the same as those of the aforesaid present first and second inventions.

In addition, since vibration of the flange part 314 and the support ring 317 in the radial direction is almost eliminated, external radial load acting against the input shaft 301 is also decreased, resulting in that a load in strength around bearings 335 and 336 of the input shaft 301, in particular, around a bearing 335 at the output shaft side is reduced and then the input shaft 301 at this part can be made a small diameter, that is, the bearing 335 can be made small. As a result, it became possible to employ the technique that a part of an outer circumference of the input shaft 301 is cut in parallel with its axial direction. This cut part is utilized to set a circumferential position between the input shaft 301 and the eccentric body 303. Advantage provided by the position setting structure has already been described in detail.

The present third invention can be necessarily applied to the system having two external-tooth gears. Actually, the present third invention is applied to the preferred embodiment of the aforesaid present first and second inventions as well as the fourth preferred embodiment to be described later. It should be noted that the circumferential position between the input shaft and the eccentric body is set by the structure having a D-shaped cross section.

Finally, the preferred embodiment of the present fourth invention will be described in detail.

Figure 10:
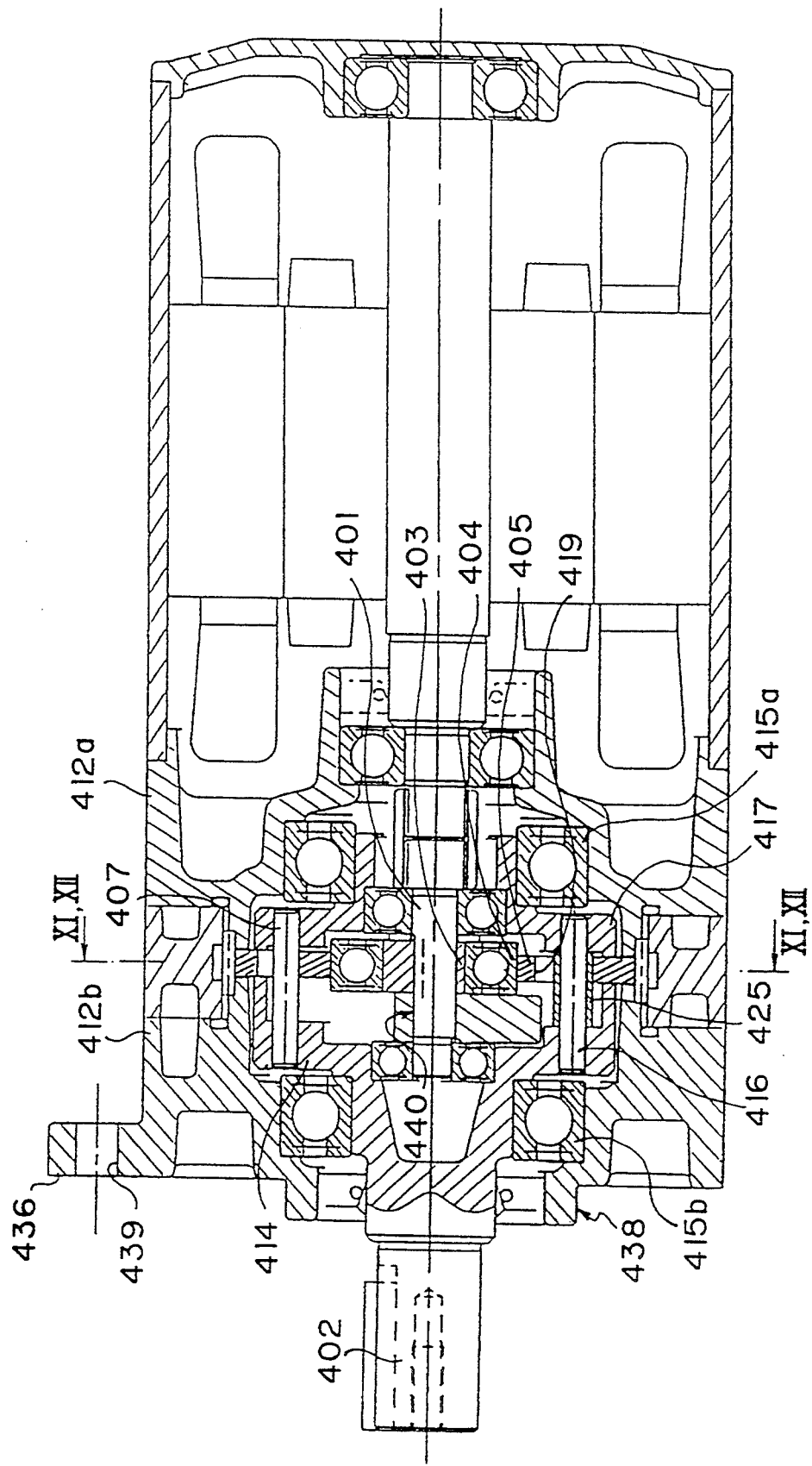
FIG. 10 is a sectional view taken along a line X—X of FIG. 11 showing a reduction gear to which an inscribed meshing planetary gear construction is applied according to the present fourth invention.
Figure 11:
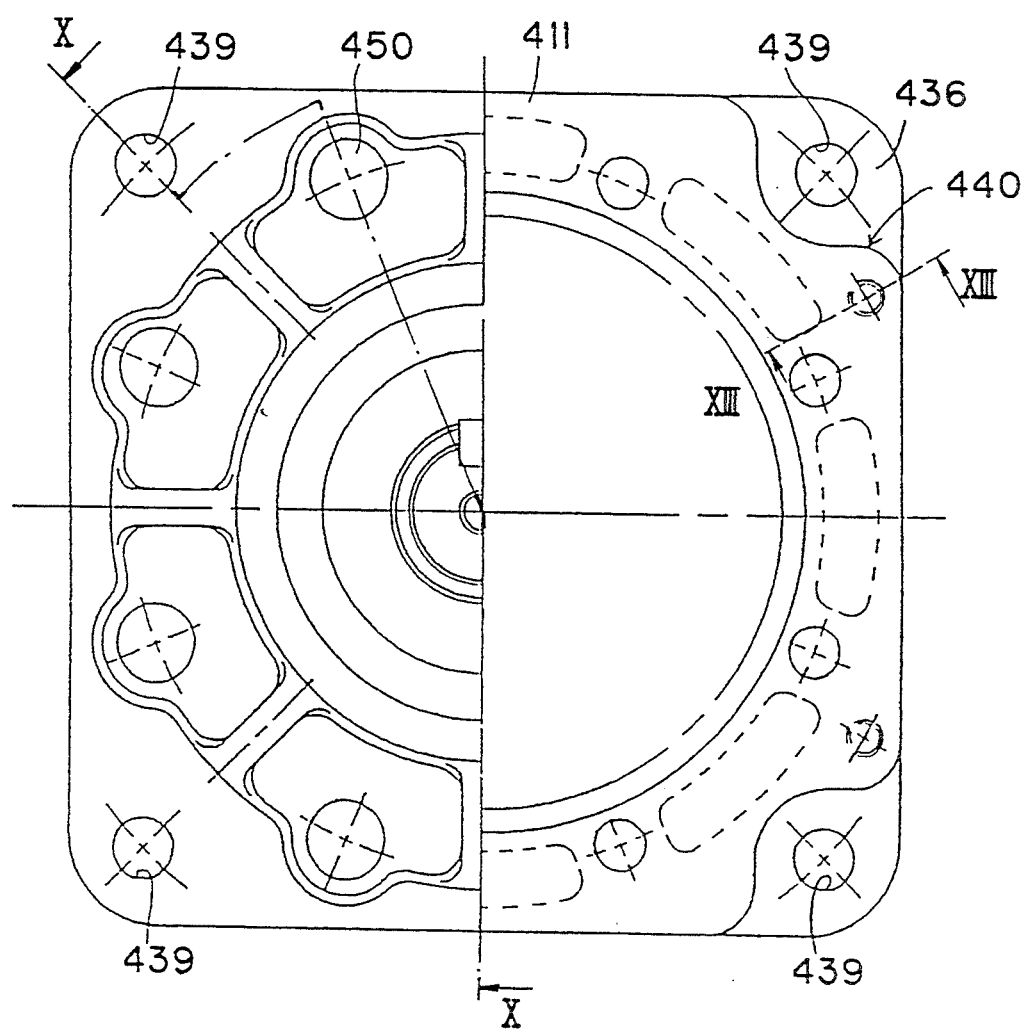
FIG. 11 is an enlarged front elevational view in which the reduction gear is viewed from the mating machine including a sectional view taken along a line XI—XI of FIG. 10.
Figure 12:
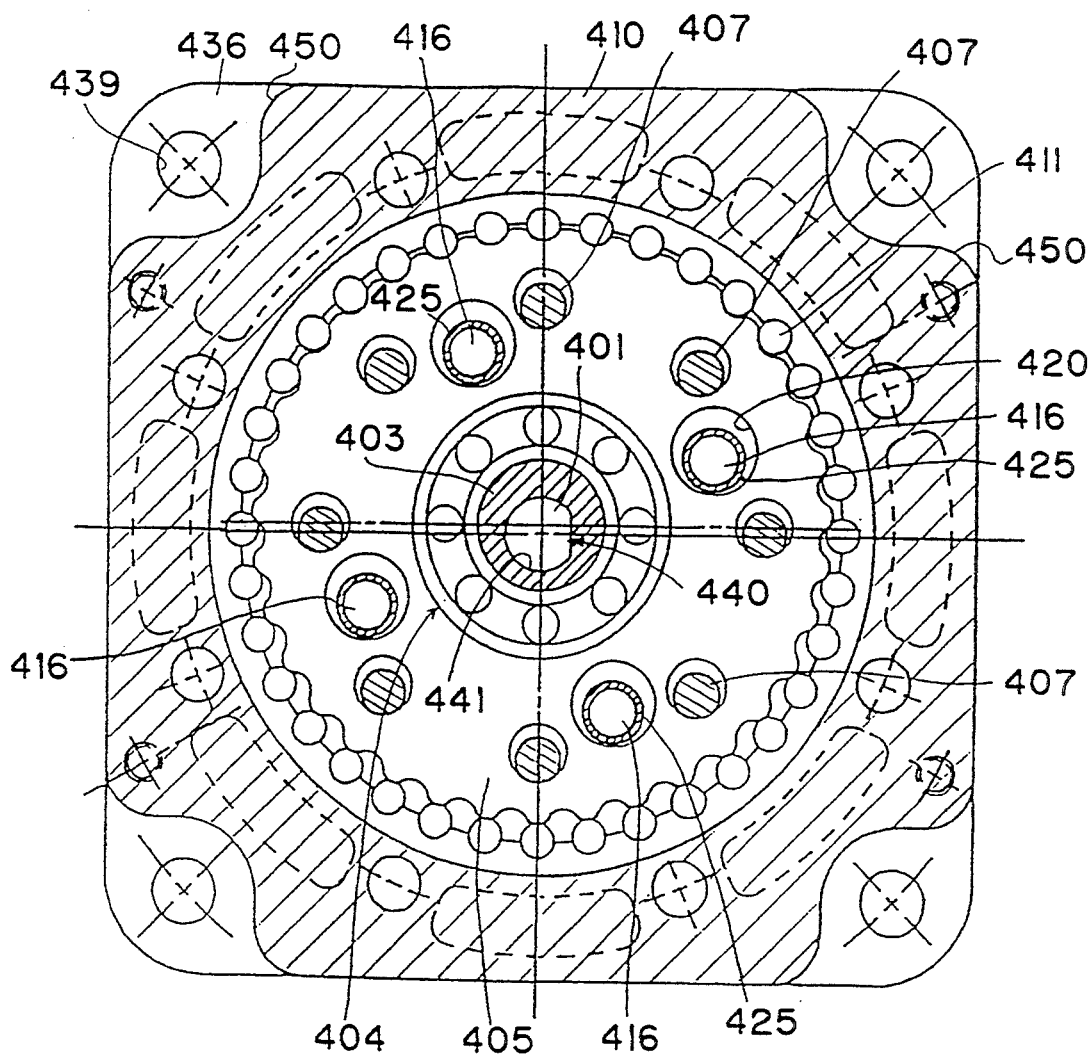
FIG. 12 is an enlarged sectional view taken along a line XII—XII of FIG. 10.
Figure 13:
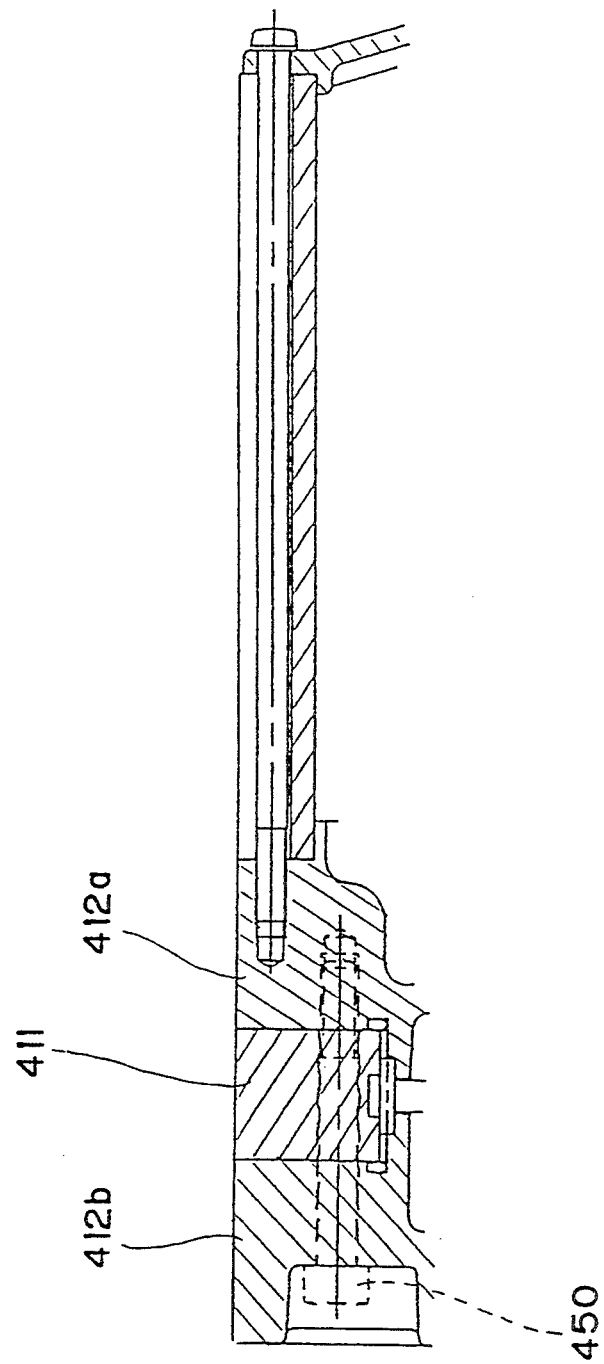
FIG. 13 is a sectional view taken along a line XIII—XIII of FIG. 11.
Figure 14:
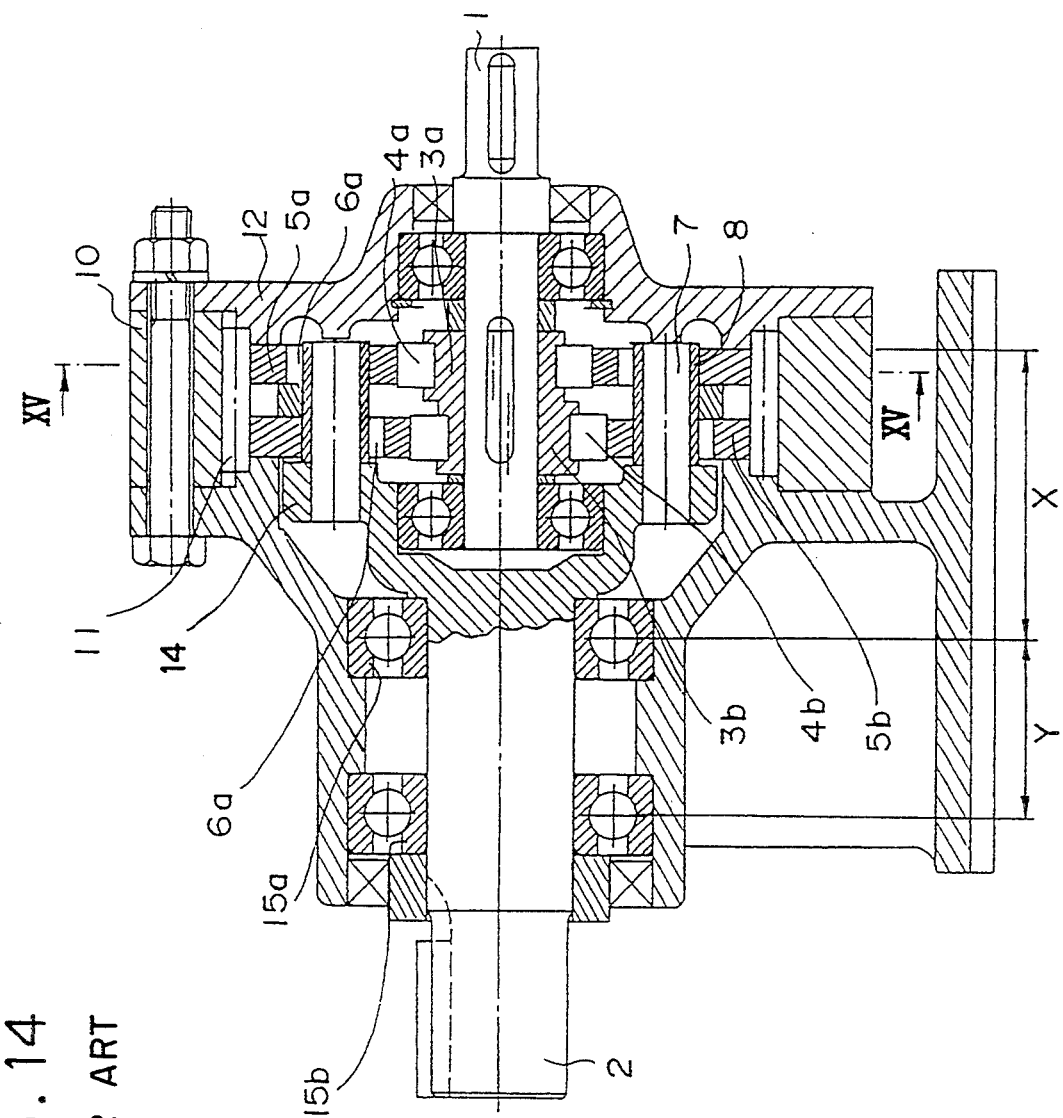
FIG. 14 is a sectional view showing a basic reduction gear to which the prior art inscribed meshing planetary gear construction is applied.
Figure 15:
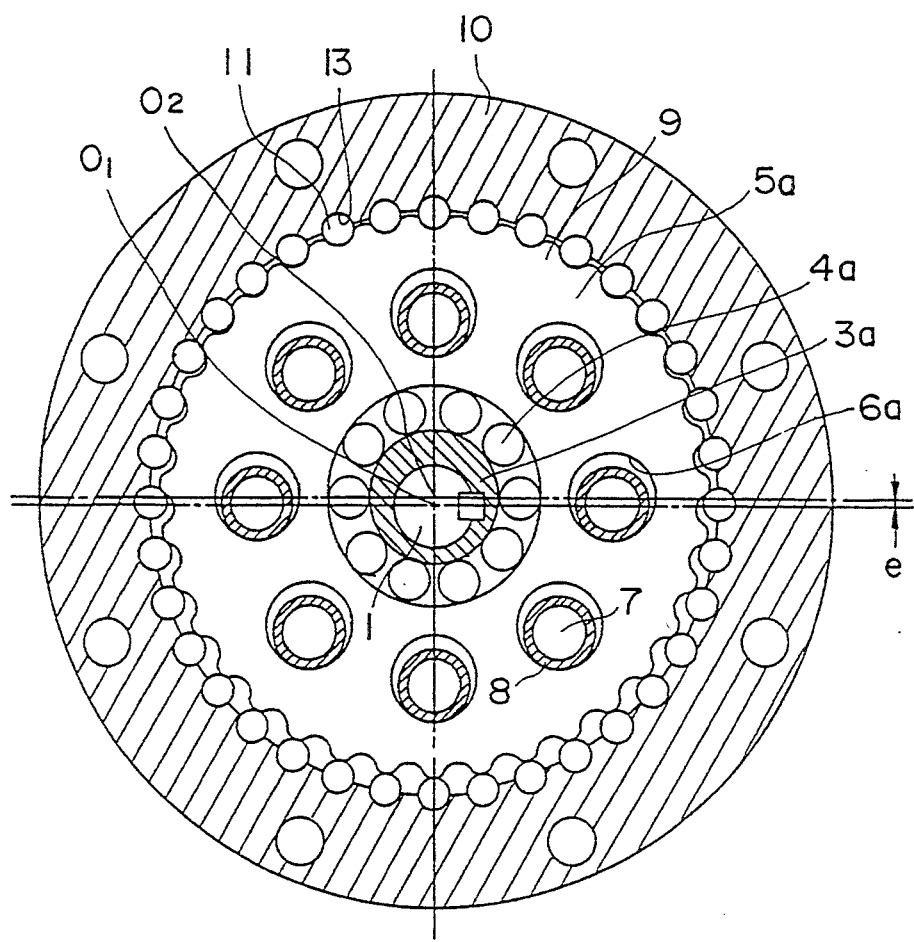
FIG. 15 is a sectional view taken along a line XV—XV of FIG. 14.
Figure 16:
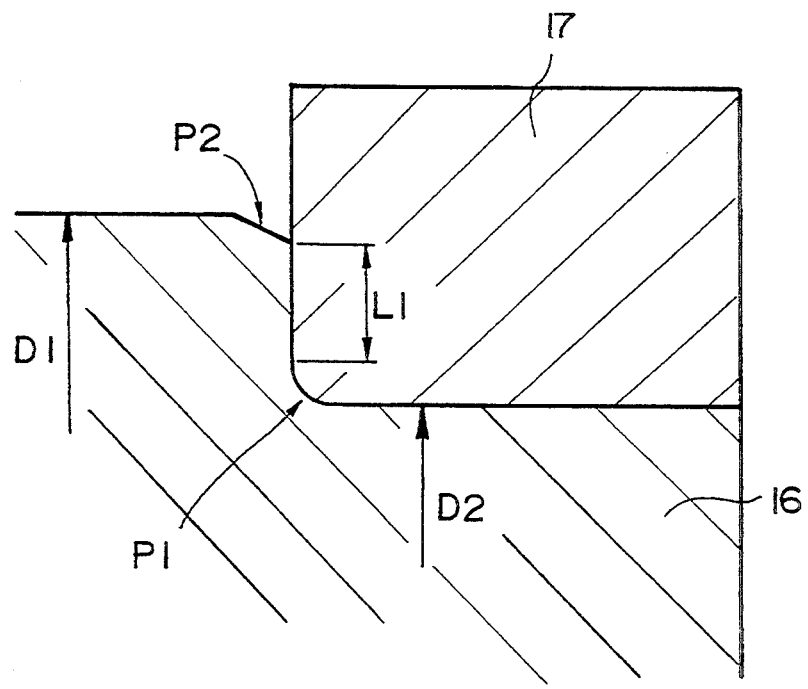
FIG. 16 is a partial sectional view illustrating a disadvantage when a carrier pin with a stage part is employed.
Figure 17:
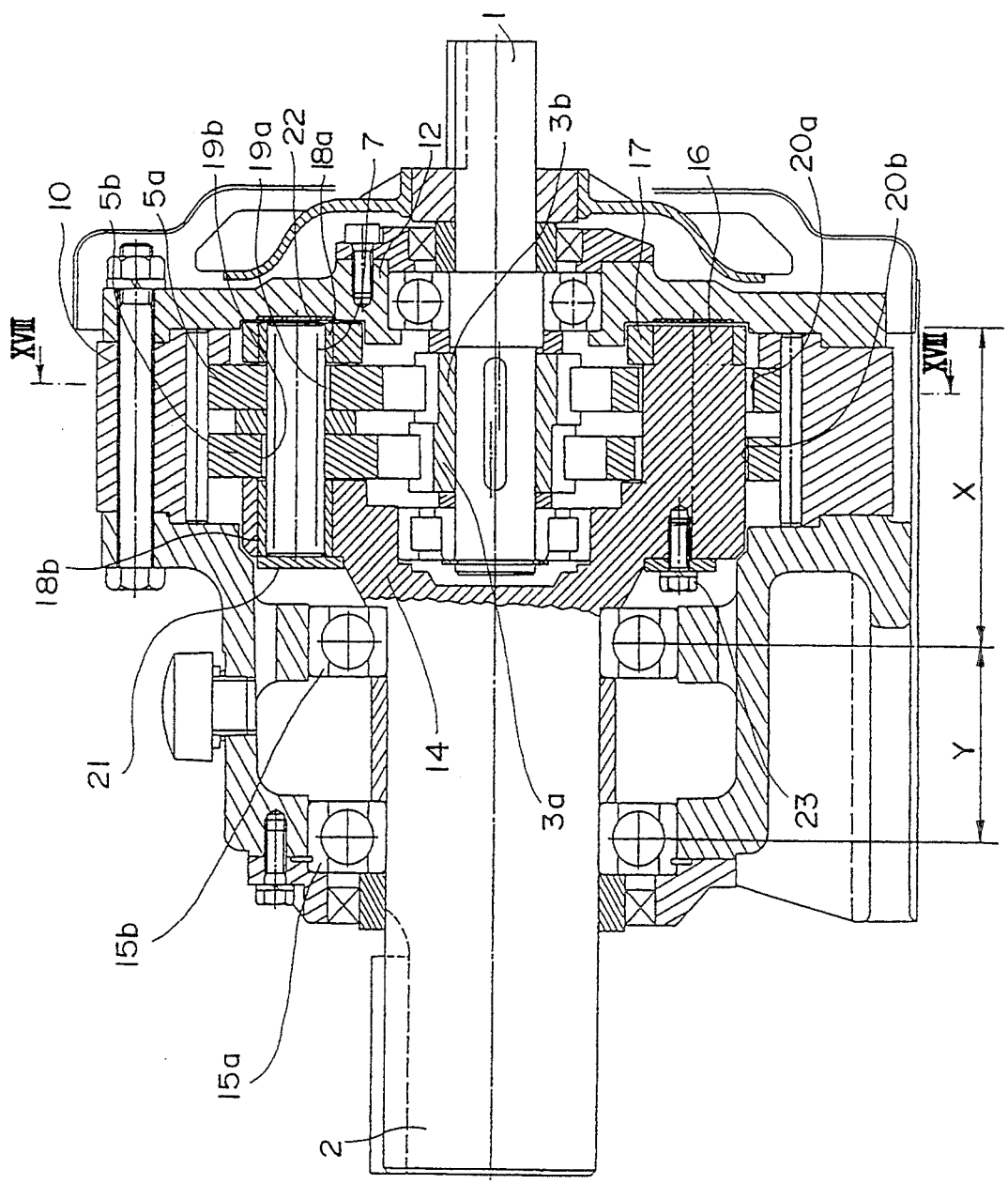
FIG. 17 is a sectional view showing a reduction gear to which the prior art inscribed meshing planetary gear construction having a carrier pin in addition to inner pins is applied.
Figure 18:
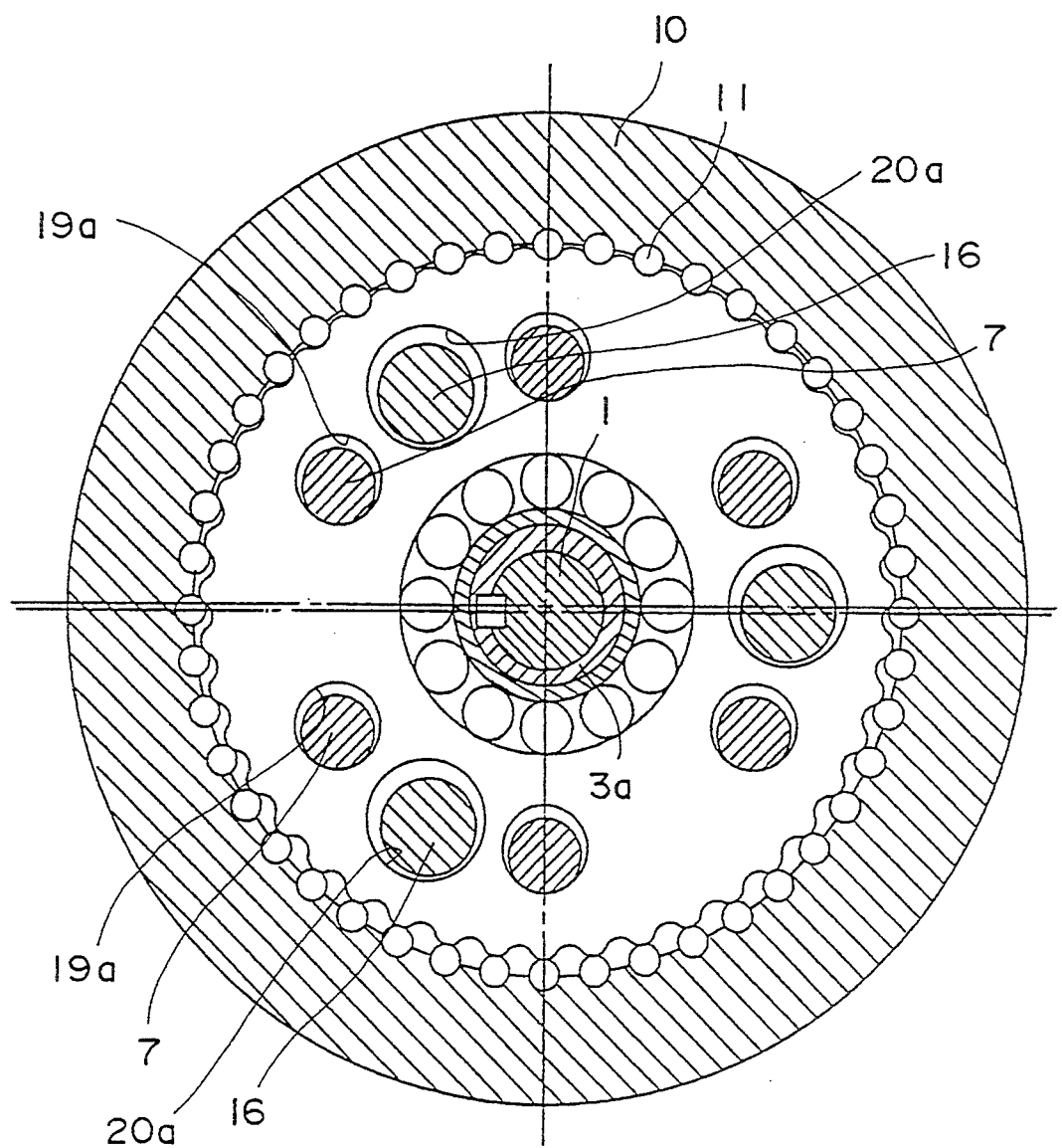
FIG. 18 is a sectional view taken along a line XVIII—XVIII of FIG. 17.
Figure 19:
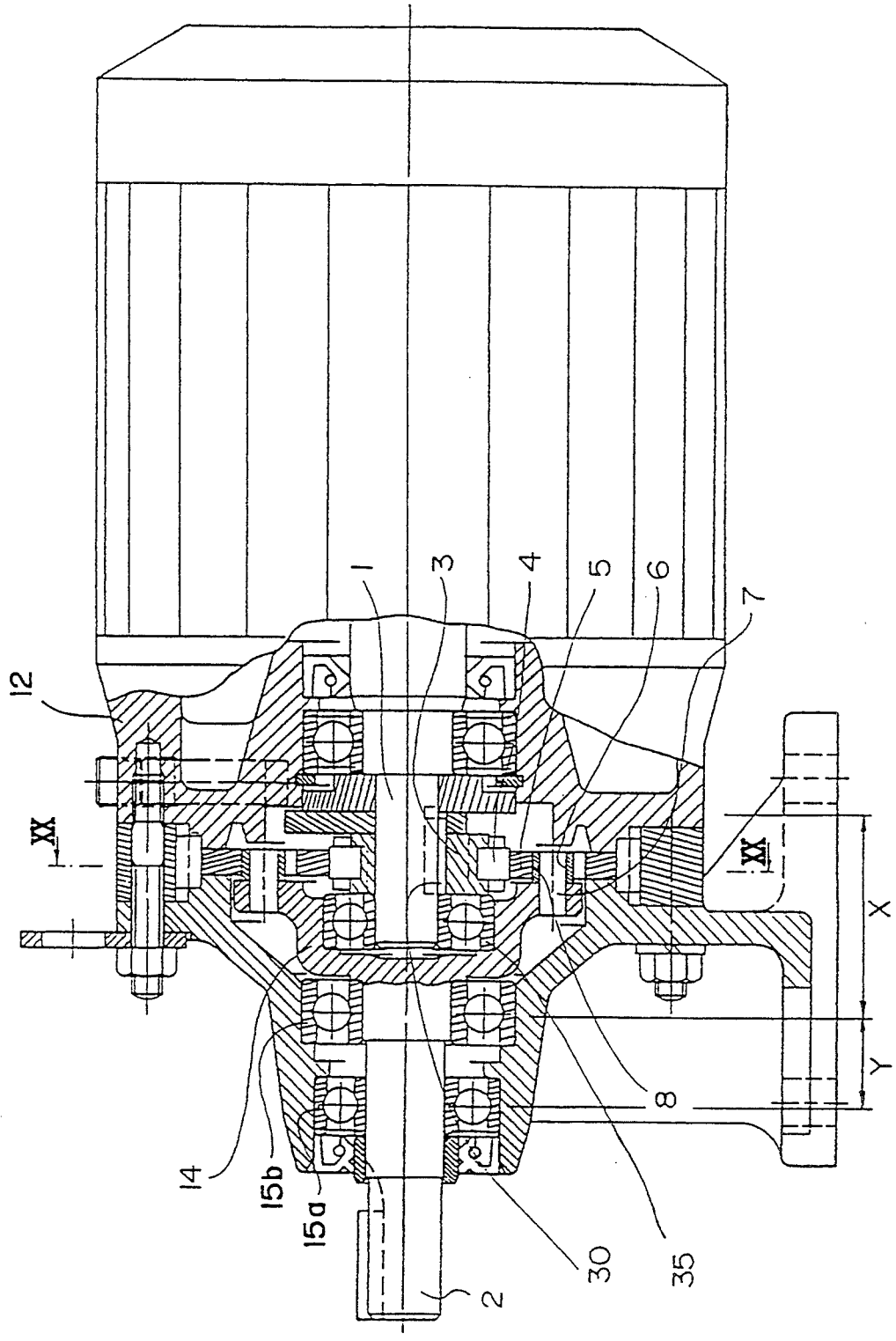
FIG. 19 is a sectional view showing a reduction gear to which the further prior art inscribed meshing planetary gear construction is applied.
Figure 20:
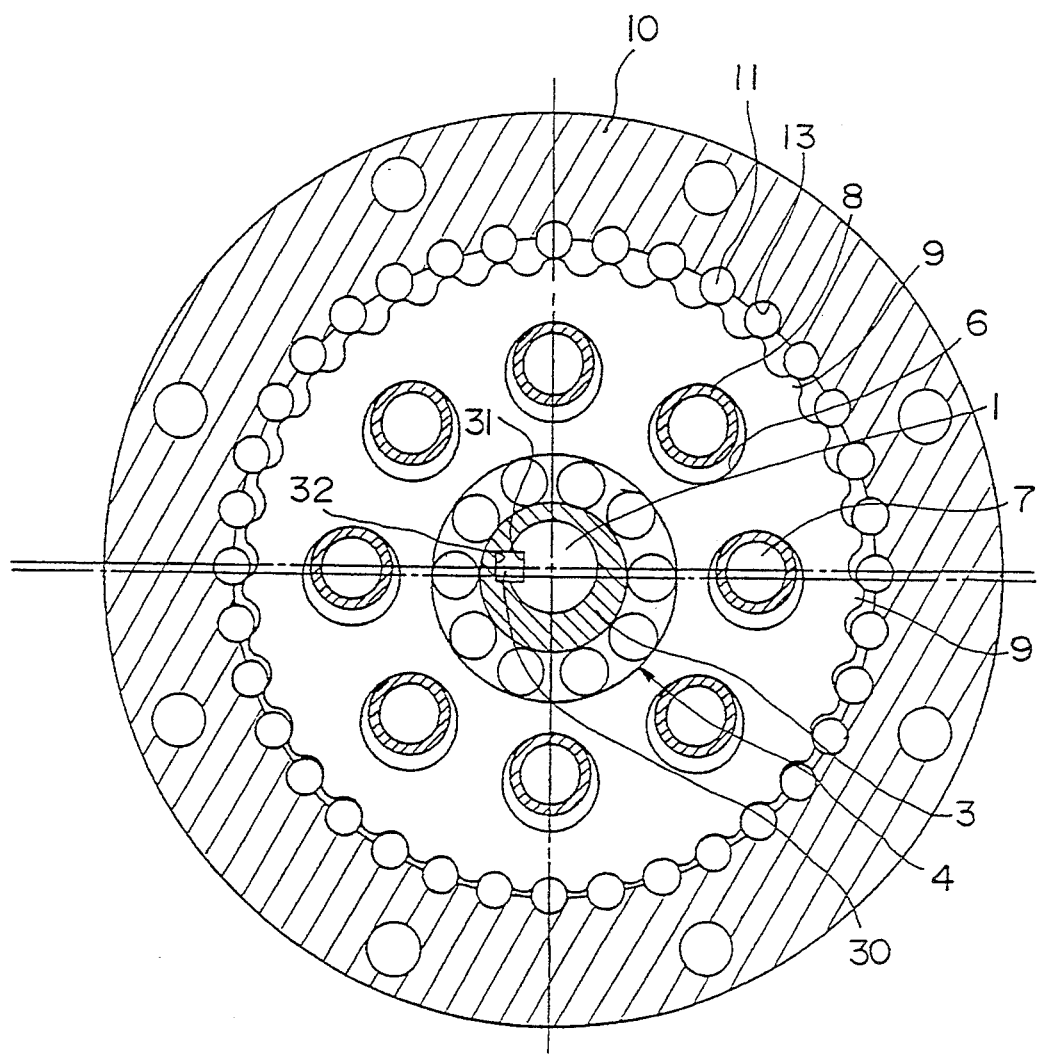
FIG. 20 is an enlarged sectional view taken along a line XX—XX of FIG. 19.
Figure 21:
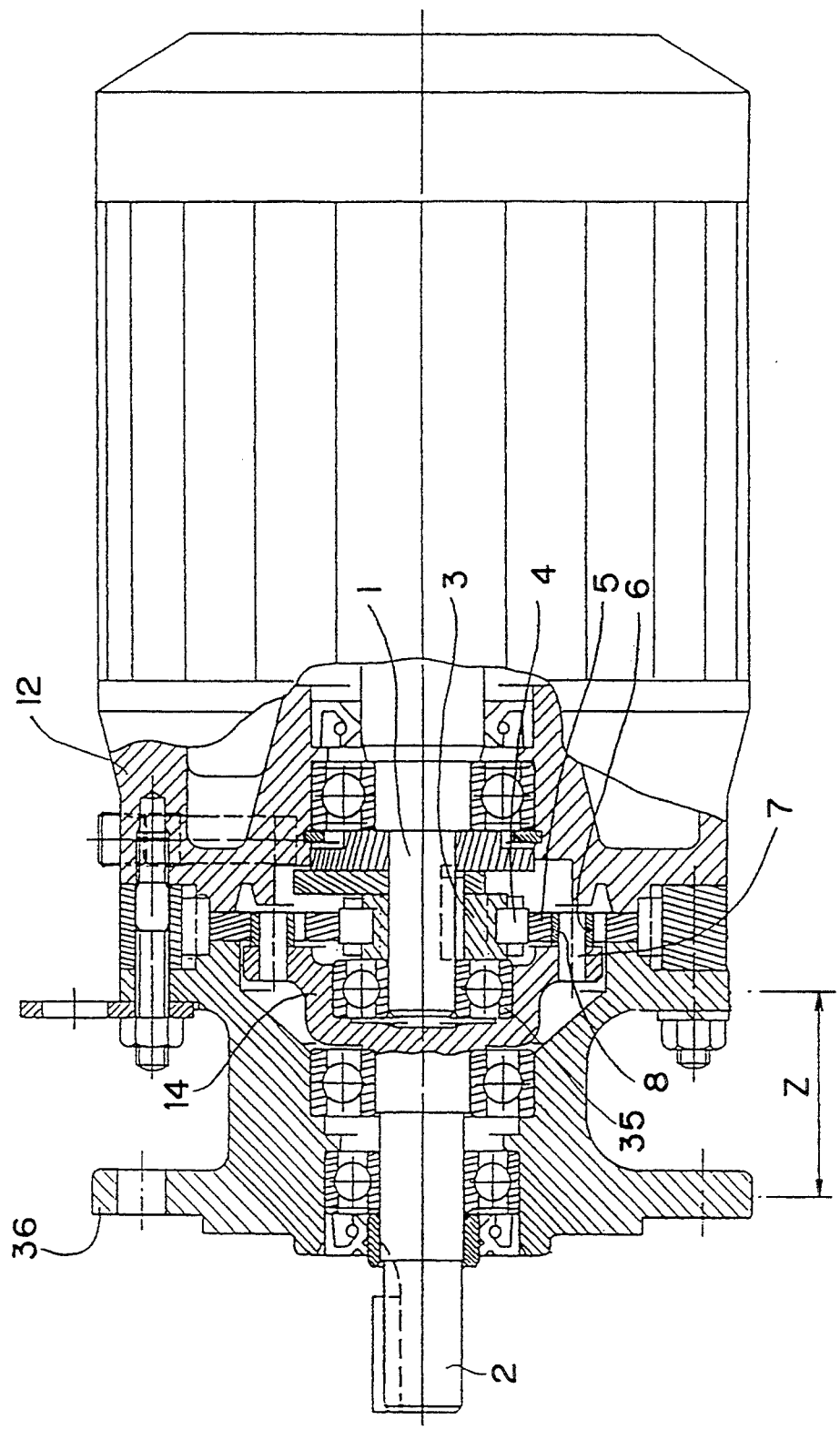
FIG. 21 is a sectional view showing an example in which an installation to a mating machine is carried out by "flange fixing" in a reduction gear of a type shown in FIGS. 19 and 20.
Figure 22:
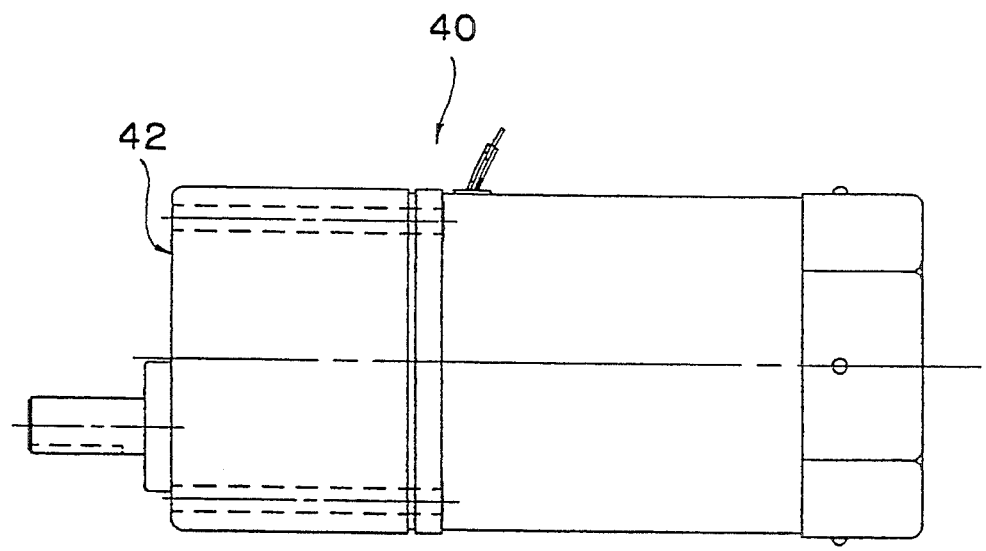
FIG. 22 is a front elevational view showing an example of a reduction gear of the prior art employing a parallel axis gear construction (not employing an inscribed meshing planetary gear construction)
Figure 23:
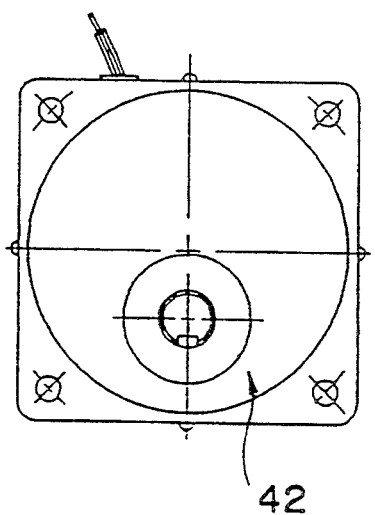
FIG. 23 is a side elevational view showing the reduction gear in FIG. 22.
Figure 24:
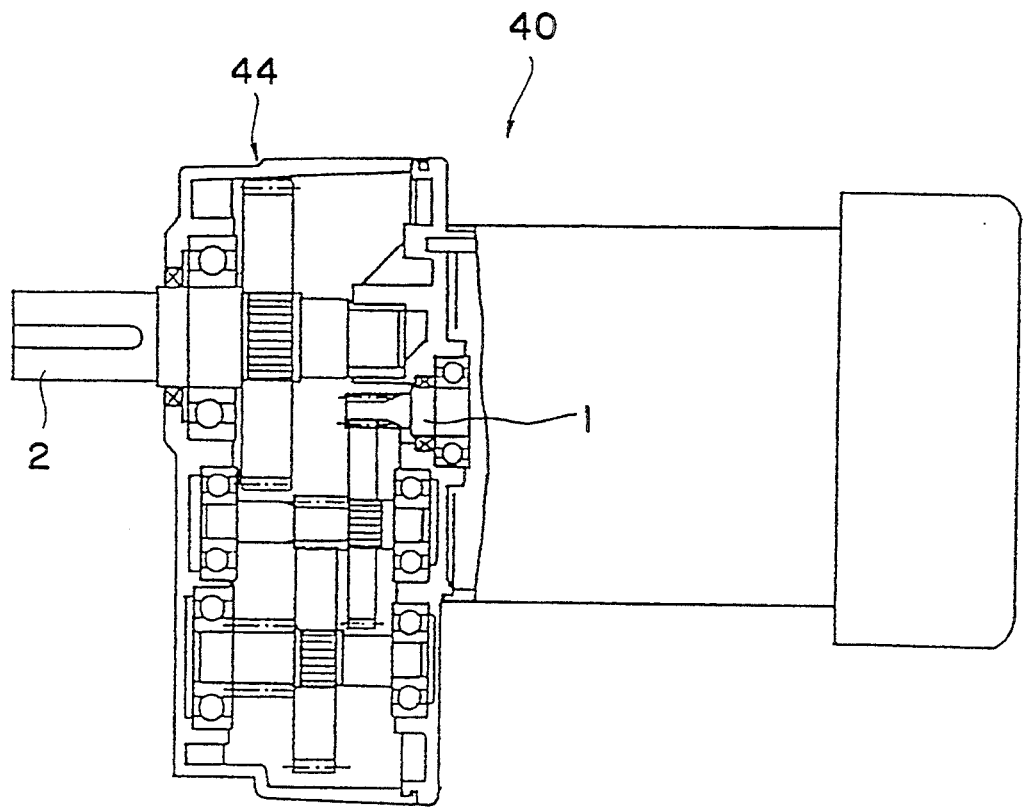
FIG. 24 is a sectional spread view showing a part of the reduction gear mechanism of the reduction gear in FIG. 22.

FIG. 10 is a sectional view (taken along a line X—X of FIG. 11) of the reduction gear to which an inscribed meshing planetary gear construction of the present fourth invention is applied. FIG. 11 is an enlarged front elevational view taken from a mating machine. At an upper right half part of FIG. 11 is illustrated a sectional view showing a casing or the like along a line XI—XI of FIG. 10. FIG. 12 is an enlarged sectional view taken along a line XII—XII of FIG. 10. FIG. 13 is a partial sectional view taken along a line XIII—XIII of FIG. 11. In each of the figures, positions of the inner pins 407 and the carrier pin 416 are not accurate positions on the sectional line.

One end of the carrier pin (carrier member) 416 separated from the flange part 414 is fitted (press fitted) to the flange part 414 of the output shaft 402. The support ring 417 is fitted (press fitted) to the other end of the carrier pin 416 and "the carrier" is constructed by the support ring 417 and the carrier pins 416.

The flange part 414, carrier pins 416 and support ring 417 are supported at both ends at a casing 412 (practically, a casing 412a at the input shaft side and a casing 412b at the output shaft side) by a pair of bearings 415a and 415b.

A pipe-like spacer 425 is fitted (press fitted) at a central part of the carrier pin 416. Accordingly, even if there is a slight difference in a fitting depth of the carrier pin 416 into the support ring 417 or the flange part 414, a distance between the support ring 417 and the flange part 414 is always kept constant under a function of the spacer 425, and then the same distance may easily be kept at the portions of all four carrier pins 416.

As shown in FIGS. 10 and 12, a part of an outer circumference of the input shaft 401 is cut in parallel with the axial direction, and is formed with the cut part 440 having a D-shaped cross section. The eccentric body 403 is provided with holes 441 having the same cross sectional shape as that of the input shaft 401 including a shape of the cut part 440 and then a position setting in a circumferential direction (a stopper of rotation) between the input shaft 401 and the eccentric body 403 is carried out through the D-shape fitting of the holes 441.

The inner pins 407 are press fitted to the support ring 417 and the flange part 414. Accordingly, their free rotation can not be attained. However, since this system is constructed in such a manner that 1) since a shape of each of the inner pins 407 is a simple column, a high accurate machining may easily be carried out with a hard raw material;

2) since it employs a structure in which a reduction gear mechanism is held and supported by a pair of bearings 415a and 415b, it is possible to substantially increase rigidity of an entire reduction gear, and the inner pins 407 can be supported under a quite stable state; and 3) since the system has a construction in which it is separated into the inner pins 407 and the carrier pin 416, a radial load coming from the output shaft or the like is received by the carrier pins 416, resulting in that there is no opportunity that a strong radial load is applied to the inner pins 407;

whereby there is no special problem even if inner rollers are practically eliminated and inner pins 407 can not rotate.

It is also possible that the inner pins 407 are not "press fitted", but "freely fitted". In this case, a position setting in an axial direction of the inner pins 407 may be carried out by a pair of bearings 415a and 415b.

As described above, the casing 412 is divided into a part 412a at the input shaft side and another part 412b at the output shaft side, and then the internal-tooth gear 410 is held by both casings 412a and 412b.

The casing 412b and the internal-tooth gear 410 at the output shaft side are formed to have an entire cross sectional with shape of square. Installing bolt holes 439 for the mating machine are formed at a top point of the square at the casing 412b of the second shaft side, and then a concave part 445 is formed axially around the installing bolt holes 439 (with the part of the installing flange 436 being left ). This concave part 445 is extended up to the internal-tooth gear 410 as it is and then an assembling of installing bolts (not shown) may easily be carried out. That is, in other words, an installing flange 436 is formed by a part F at which is not formed in the concave part 445 of casing 412b at the output shaft side.

Connection and fixing of the casing 412a at the input shaft side, internal-tooth gear 410 and the casing 412b at the output shaft side are carried out by screwing bolts 450 from the casing 412b at the output shaft side. The reduction gear mechanism is supported at both ends by a pair of bearings 415a and 415b, and there is no part corresponding to a region Y as found in the prior art, resulting in that the casing 412b at the output shaft side is not necessarily to have a double flange structure, whereby an axial shortening of the part corresponding to a clearance Z (refer to FIG. 7) of the two flanges is attained, and a shape of the casing 412b at the output shaft side can be quite simplified. Therefore, for example, when it is manufactured by aluminum die-cast or aluminum castings, a combination of only two molds enables an easy and low cost manufacturing.

In turn, a central location part 438 is concentrically formed around the output shaft 402. The output shaft 402 is concentrically formed with the input shaft 401 due to features of the inscribed meshing planetary gear construction being applied. Therefore the central location part 438 is concentric with the output shaft 402 as well as with the input shaft 401, and in addition, the four installing bolt holes 439 of the installing flange 436 are also concentric to each other. Therefore, centering and installing of it to the mating machine may quite easily be carried out and the fixing can be performed in a minimum space.

Action of this preferred embodiment will be described.

It is quite the same action as that of the prior art well-known example that the external-tooth gear 405 is oscillatably rotated together with a rotation of the input shaft 401 and a rotation of the input shaft 401 becomes a reduced rotation (a self rotation) of the external-tooth gear 405 under an engagement (meshing) between the external pins 411 corresponding to the inner pins of the internal-tooth gear 410 and the external-tooth gear 405.

Oscillating component of the rotation of the external-tooth gear 405 is absorbed by clearances between the inner pin holes 419 (corresponding to the inner roller holes) and the inner pins 407, only the rotational component is transmitted to the flange part 414 of the output shaft 402 and the support ring 417. Rotational force transmitted to the support ring 417 is transmitted to the output shaft 402 through the carrier pin 416.

Since the external radial load acting against the output shaft 402 is received at its both ends by the bearing 415b, and by the bearing 415a through the carrier pins 416 and the support ring 417, no influence of the external radial load is applied to the inner pins 407. This action is quite the same as those of the present first to the third inventions.

As a result, a load of the inner pins 407 is quite reduced, and a shape of the inner pins 407 can be quite simplified, resulting in that a high accurate machining may easily be realized with a hard raw material, and then a superior "isokinetic inscribed meshing mechanism" can be constructed without any inner rollers. Since there are carrier pins 416, the inner pins 407 can also be assembled to be freely fitted and rotated, then a more smooth "isokinetic inscribed meshing mechanism" can be realized.

Since the input shaft 401, the output shaft 402, the centering location part 438 and the installing bolt holes 439 are concentrically aligned, the centering and fixing against the mating machine become quite easy as already been described.

While the invention has been described with reference to specific embodiments, their descriptions are illustrative and are not to be constructed as limiting the scope of the invention. Various modifications and changes may occur to those skilled in the art without departing from the spirit and scope of the invention as defind by the appended claims.

What is claimed is:

1. An inscribed meshing planetary gear construction which comprises; a first shaft, an eccentric body mounted the first shaft, an external-tooth gear placed on an eccentric axis on the first shaft through the eccentric body, an internal-tooth gear with which the external-tooth gear is inscribed and meshed, a second shaft connected to the external-tooth gear through means for transmitting only a rotational component of the external-tooth gear, and a casing, said means for transmitting the rotational component comprising inner pins acting as an isokinetic inscribed meshing mechanism in respect to inner pin holes disposed in the external-tooth gear, an annular support ring for receiving a rotation corresponding to the rotational component of the external-tooth gear through the inner pins, and a carrier member projected from a flange part formed in the second shaft, connected and fixed to the support ring, wherein said annular support ring and said flange part of the second shaft are disposed while holding the external-tooth gear therebetween, both said support ring and said flange part are supported by said casing through a pair of bearings, said carrier member itself is a separated body from said support ring and said flange part, and formed in a substantial column-like shape, a pipe-like spacer is press fitted in advance to a central part of said carrier member in which both ends are press fitted to said support ring and said flange part, and an axial position of the support ring, the carrier member and the flange part is set through said spacer.

2. An inscribed meshing planetary gear construction according to claim 1, wherein;

said inner pins are freely fitted to said support ring and said flange part.

3. An inscribed meshing planetary gear construction which comprises; a first shaft, an eccentric body mounted the first shaft, an external-tooth gear placed on an eccentric axis on the first shaft through the eccentric body, an internal-tooth gear with which the external-tooth gear is inscribed and meshed, a second shaft connected to the external-tooth gear through means for transmitting only a rotational component of the external-tooth gear, and a casing, said means for transmitting the rotational component comprising inner pins acting as an isokinetic inscribed meshing mechanism in respect to inner pin holes disposed in the external-tooth gear, an annular support ring for receiving a rotation corresponding to the rotational component of the external-tooth gear through the inner pins, and a carrier member projected from a flange part formed in the second shaft, connected and fixed to the support ring, wherein said annular support ring and said flange part of the second shaft are disposed while holding the external-tooth gear therebetween, both said support ring and said flange part are supported by said casing through a pair of bearings, said carrier member itself is a separated body from said support ring and said flange part, and formed in a substantial column-like shape, a pipe-like spacer is press fitted in advance to a central part of said carrier member in which both ends are freely fitted to said support ring and said flange part, an axial position of the support ring, the carrier member and the flange part is set by holding the flange part, the spacer and the support ring by means of a stopper ring means disposed at one end of said carrier member and a screw-nut means disposed at the other end of said carrier member.

4. An inscribed meshing planetary gear construction according to claim 3, wherein; said pair of bearings has an inner ring and an outer ring respectively, said inner pins are freely fitted to said support ring and said flange part, and axial positions of said inner pins are set by either said inner rings of the pair of bearings, or said outer rings of said pair of bearings.

* * * * *